(12) United States Patent
Kim et al.

(10) Patent No.: US 12,194,969 B2
(45) Date of Patent: Jan. 14, 2025

(54) ELECTRONIC BRAKE SYSTEM AND METHOD FOR OPERATING SAME

(71) Applicant: HL MANDO CORPORATION, Gyeonggi-do (KR)

(72) Inventors: Jin Seok Kim, Gyeonggi-do (KR); Seong Ho Choi, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 462 days.

(21) Appl. No.: 17/614,370

(22) PCT Filed: Apr. 29, 2020

(86) PCT No.: PCT/KR2020/005812
§ 371 (c)(1),
(2) Date: Nov. 26, 2021

(87) PCT Pub. No.: WO2020/242072
PCT Pub. Date: Dec. 3, 2020

(65) Prior Publication Data
US 2022/0242381 A1   Aug. 4, 2022

(30) Foreign Application Priority Data

May 31, 2019   (KR) .................. 10-2019-0064831

(51) Int. Cl.
*B60T 13/68* (2006.01)
*B60T 8/40* (2006.01)
(Continued)

(52) U.S. Cl.
CPC .......... *B60T 13/686* (2013.01); *B60T 8/4086* (2013.01); *B60T 13/142* (2013.01); *B60T 17/221* (2013.01);
(Continued)

(58) Field of Classification Search
CPC .......... F16K 13/10; F16K 15/00; F16K 31/06; F16K 31/12; B60T 17/221; B60T 17/22;
(Continued)

(56) References Cited

U.S. PATENT DOCUMENTS 5,729,979 A * 3/1998 Shaw ..................... B60T 7/042
60/533
2003/0222497 A1  12/2003 Fey et al.
(Continued)

FOREIGN PATENT DOCUMENTS

CN   105142999   12/2015
CN   108657154   10/2018
(Continued)

OTHER PUBLICATIONS

Office Action dated Sep. 15, 2023 for Chinese Patent Application No. 202080038565.2 and its English machine translation by Google Translate.
(Continued)

*Primary Examiner* — Robert A. Siconolfi
*Assistant Examiner* — San M Aung
(74) *Attorney, Agent, or Firm* — WOMBLE BOND DICKINSON (US) LLP

(57) ABSTRACT

Disclosed is to an electronic brake system. The electronic brake system includes an integrated master cylinder having a simulation chamber, a first master chamber, and a second master chamber arranged in order from a side of a brake pedal, wherein the integrated master cylinder includes a simulation piston provided to be displaceable by the brake pedal to pressurize the simulation chamber, a first master piston configured to pressurize the first master chamber and having a diameter smaller than a diameter of the simulation piston, a second master piston configured to pressurize the second master chamber and having a diameter smaller than (Continued)

a diameter of the first master piston, and an elastic member interposed between the simulation piston and the first master piston to provide the brake pedal with a reaction force.

19 Claims, 10 Drawing Sheets

(51) Int. Cl.
*B60T 13/14* (2006.01)
*B60T 17/22* (2006.01)

(52) U.S. Cl.
CPC ..... *B60T 2270/10* (2013.01); *B60T 2270/402* (2013.01); *B60T 2270/404* (2013.01); *B60T 2270/82* (2013.01)

(58) Field of Classification Search
CPC .... B60T 13/686; B60T 13/148; B60T 13/142; B60T 7/042; B60T 8/4086; B60T 2270/10; B60T 2270/82; B60T 2270/402; B60T 2270/404; B60T 13/662; B60T 2220/04; B60T 2270/406; B60Y 2304/05
USPC .......................................................... 303/13
See application file for complete search history.

(56) References Cited

U.S. PATENT DOCUMENTS

| | | | |
|---|---|---|---|
| 2017/0158184 A1* | 6/2017 | Choi | B60T 17/221 |
| 2018/0273008 A1* | 9/2018 | Kim | B60T 13/58 |
| 2018/0339692 A1* | 11/2018 | Jeong | B60T 13/686 |
| 2019/0092300 A1* | 3/2019 | Jeong | B60T 13/686 |
| 2019/0100183 A1* | 4/2019 | Jung | B60T 7/042 |

FOREIGN PATENT DOCUMENTS

| | | |
|---|---|---|
| JP | 2008-265431 | 11/2008 |
| KR | 10-2015-0138295 | 12/2015 |
| KR | 10-2016-0028043 | 3/2016 |
| KR | 10-2018-0109179 | 10/2018 |
| KR | 10-2019-0029050 | 3/2019 |

OTHER PUBLICATIONS

Office Action dated Sep. 29, 2023 for Korean Patent Application No. 10-2019-0064831 and its English translation from Global Dossier.
International Search Report for PCT/KR2020/005812 mailed on Aug. 26, 2020 (now published as WO 2020/242072) with English translation provided by WIPO.
Written Opinion of the International Searching Authority for PCT/KR2020/005812 mailed on Aug. 26, 2020 (now published as WO 2020/242072) with English translation provided by Google Translate.

* cited by examiner

ELECTRONIC BRAKE SYSTEM AND METHOD FOR OPERATING SAME

CROSS-REFERENCE TO RELATED APPLICATIONS

This application is the national stage of International Application No. PCT/KR2020/005812, filed on Apr. 29, 2020, which claims the priority benefit under 35 U.S.C § 119 (a) of Patent Application No. 10-2019-0064831, filed on May 31, 2019 in Korea, the entire contents of which are incorporated herein by reference.

TECHNICAL FIELD

The present disclosure relates to an electronic brake system and an operation method thereof, and more particularly, to an electronic brake system and an operation method thereof for generating a braking force using an electrical signal corresponding to a displacement of a brake pedal.

BACKGROUND ART

In general, vehicles are essentially equipped with a brake system for performing braking, and various types of brake systems have been proposed for the safety of drivers and passengers.

In a conventional brake system, a method of supplying a hydraulic pressure required for braking to wheel cylinders using a mechanically connected booster when a driver depresses a brake pedal has been mainly used. However, as market demands to implement various braking functions in a detailed response to operation environments of vehicles increase, in recent years, an electronic brake system, that receives an electrical signal corresponding to a stepping force by a driver from a pedal displacement sensor that detects a displacement of a brake pedal when the driver depresses the brake pedal and operates a hydraulic pressure supply device based on the electric signal to supply a hydraulic pressure required for braking to wheel cylinders, have been widely used.

In such an electronic brake system, an electrical signal is generated and provided when a driver depresses the brake pedal in a normal operation mode, and based on the electric signal, the hydraulic pressure supply device is electrically operated and controlled to generate a hydraulic pressure required for braking and transfer the hydraulic pressure to the wheel cylinders. As such, although such an electronic brake system and an operation method are electrically operated and controlled so that complex and various braking operations may be implemented, when a technical problem occurs in an electric component, a hydraulic pressure required for braking may not be stably generated, and thus the safety of passengers may not be secured.

Therefore, the electronic brake system enters the abnormal operation mode when a component fails or becomes out of control, and in this case, a mechanism is required in which the operation of the brake pedal by a driver is directly linked to the wheel cylinders. That is, in the abnormal operation mode in the electronic brake system, as the driver depresses the brake pedal, a hydraulic pressure required for braking needs to be generated immediately and transferred directly to the wheel cylinders.

DISCLOSURE

Technical Problem

The present disclosure is directed to providing an electronic brake system capable of reducing the number of parts to be applied and achieving a miniaturization and lightweight of a product.

The present disclosure is directed to providing an electronic brake system capable of effectively implementing braking in various operating situations.

The present disclosure is directed to providing an electronic brake system capable of stably generating a high-pressure braking pressure.

The present disclosure is directed to providing an electronic brake system capable of improving performance and operational reliability.

The present disclosure is directed to providing an electronic brake system capable of improving durability of a product by reducing loads applied to components.

The present disclosure is directed to providing an electronic brake system capable of improving easiness of assembly and productivity of a product and reducing a manufacturing cost of the product.

Technical Solution

An aspect provides an electronic brake system including: a reservoir in which a pressurized medium is stored; an integrated master cylinder having a simulation chamber, a first master chamber, and a second master chamber arranged in order from a side of a brake pedal; a reservoir flow path communicating the integrated master cylinder with the reservoir; a hydraulic pressure supply device configured to generate a hydraulic pressure by operating according to an electrical signal output in response to a displacement of the brake pedal; a first hydraulic circuit and a second hydraulic circuit configured to control a flow of the hydraulic pressure transferred to a wheel cylinder; and a hydraulic control unit configured to control a flow of the hydraulic pressure transferred to the first hydraulic circuit and the second hydraulic circuit, wherein the integrated master cylinder includes a simulation piston provided to be displaceable by the brake pedal and configured to pressurize the simulation chamber, a first master piston configured to pressurize the first master chamber and having a diameter smaller than a diameter of the simulation piston, a second master piston configured to pressurize the second master chamber and having a diameter smaller than a diameter of the first master piston, and an elastic member interposed between the simulation piston and the first master piston to provide the brake pedal with a reaction force.

The electronic brake system may further include first backup flow path connecting the simulation chamber to the first hydraulic circuit; a second backup flow path connecting the first master chamber to the second hydraulic circuit; and an auxiliary backup flow path connecting the second master chamber to the first backup flow path.

The electronic brake system may include: at least one outlet valve provided in the first backup flow path and configured to control a flow of the pressurized medium; and a cut valve provided in the second backup flow path and configured to control a flow of the pressurized medium.

The second backup flow path may be connected to an inlet flow path downstream of at least one of two inlet valves of the second hydraulic circuit.

The auxiliary backup flow path may be provided with an orifice.

The at least one outlet valve connected to the first backup flow path may be connected in parallel to a check valve for allowing a flow of the pressurized medium from the first backup flow path to the wheel cylinder.

The electronic brake system may further include: a simulation flow path connecting the simulation chamber to the reservoir and provided with a simulator check valve for allowing only a flow of the pressurized medium from the reservoir to the simulation chamber; and a simulator bypass flow path provided with a simulator valve that is connected in parallel to the simulator check valve and controls bidirectional flows of the pressurized medium.

The reservoir flow path may include: a first reservoir flow path connecting the first master chamber to the reservoir; and a second reservoir flow path connecting the second master chamber to the reservoir.

The hydraulic pressure supply device may include a first pressure chamber and a second pressure chamber pressurized according to a forward movement and a backward movements, respectively, of a hydraulic piston, wherein the hydraulic control unit may include: a first hydraulic flow path in communication with the first pressure chamber; a second hydraulic flow path in communication with the second pressure chamber; a third hydraulic flow path at which the first hydraulic flow path and the second third hydraulic flow path join; a fourth hydraulic flow path branched from the third hydraulic flow path and connected to the first hydraulic circuit; a fifth hydraulic flow path branched from the third hydraulic flow path and connected to the second hydraulic circuit; a sixth hydraulic flow path in communication with the first hydraulic circuit; a seventh hydraulic flow path in communication with the second hydraulic circuit; an eighth hydraulic flow path at which the sixth hydraulic flow path and the seventh hydraulic flow path join; a ninth hydraulic flow path branched from the eighth hydraulic flow path and connected to the first pressure chamber; and a tenth hydraulic flow path branched from the eighth hydraulic flow path and connected to the second pressure chamber.

The hydraulic control unit may include: a first valve provided in the first hydraulic flow path to control a flow of the pressurized medium; a second valve provided in the second hydraulic flow path to control a flow of the pressurized medium; a third valve provided in the fourth hydraulic flow path to control a flow of the pressurized medium; a fourth valve provided in the fifth hydraulic flow path to control a flow of the pressurized medium; a fifth valve provided in the sixth hydraulic flow path to control a flow of the pressurized medium; a sixth valve provided in the seventh hydraulic flow path to control a flow of the pressurized medium; a seventh valve provided in the ninth hydraulic flow path to control a flow of the pressurized medium; and an eighth valve provided in the tenth hydraulic flow path to control a flow of the pressurized medium.

The first valve may be provided as a check valve for allowing only a flow of the pressurized medium discharged from the first pressure chamber; the second valve may be provided as a check valve for allowing only a flow of the pressurized medium discharged from the second pressure chamber; the third valve may be provided as a check valve for allowing only a flow of the pressurized medium from the third hydraulic flow path toward the first hydraulic circuit; the fourth valve may be provided as a check valve for allowing only a flow of the pressurized medium from the third hydraulic flow path toward the second hydraulic circuit; the fifth valve may be provided as a check valve for allowing only a flow of the pressurized medium discharged from the first hydraulic circuit, the sixth valve may be provided as a check valve for allowing only a flow of the pressurized medium discharged from the second hydraulic circuit; and the seventh valve and the eighth valve may be each provided as a solenoid valve for controlling bidirectional flows of the pressurized medium.

The electronic brake system may further include a dump controller provided between the reservoir and the hydraulic pressure supply device to control a flow of the pressurized medium, wherein the dump controller may include: a first dump flow path provided to connect the first pressure chamber to the reservoir; a first dump check valve provided in the first dump flow path to allow only a flow of the pressurized medium from the reservoir toward the first pressure chamber; a first bypass flow path connected in parallel to the first dump check valve on the first dump flow path; a first dump valve provided in the first bypass flow path to control bidirectional flows of the pressurized medium; a second dump flow path provided to connect the second pressure chamber to the reservoir; a second dump check valve provided in the second dump flow path to allow only a flow of the pressurized medium from the reservoir toward the second pressure chamber; a second bypass flow path connected in parallel to the second dump check valve on the second dump flow path; and a second dump valve provided in the second bypass flow path to control bidirectional flows of the pressurized medium.

The first master chamber may have a diameter smaller than a diameter of the simulation chamber, and larger than a diameter of the second master chamber.

Another aspect provides an operation method of the electronic brake system according to claim 12, including: a first braking mode in which the first pressure chamber is pressurized; a second braking mode in which the second pressure chamber is pressurized after the first braking mode; and a third braking mode in which the first pressure chamber is pressurized after the second braking mode.

In the first braking mode, the seventh valve, the eight valve, and the first dump valve may be closed, and the second dump valve may be open, and the hydraulic pressure generated in the first pressure chamber may be provided to the first hydraulic circuit by sequentially passing through the first hydraulic flow path, the third hydraulic flow path, and the fourth hydraulic flow path, and may be provided to the second hydraulic circuit by sequentially passing through the first hydraulic flow path, the third hydraulic flow path, and the fifth hydraulic flow path.

In the second braking mode, the seventh valve, the eight valve, and the second dump valve may be closed, and the first dump valve may be open, the hydraulic pressure generated in the second pressure chamber may be provided to the first hydraulic circuit by sequentially passing through the second hydraulic flow path, the third hydraulic flow path, and the fourth hydraulic flow path, and may be provided to the second hydraulic circuit by sequentially passing through the second hydraulic flow path, the third hydraulic flow path, and the fifth hydraulic flow path.

In the third braking mode, the seventh valve and the eight valve may be open, and the first dump valve and the second dump valve may be closed, at least a part of the hydraulic pressure generated in the first pressure chamber may be provided to the first hydraulic circuit by sequentially passing through the first hydraulic flow path, the third hydraulic flow path, and the fourth hydraulic flow path, and may be provided to the second hydraulic circuit by sequentially passing through the first hydraulic flow path, the third hydraulic flow path, and the fifth hydraulic flow path, and a remaining part of the hydraulic pressure generated in the first pressure chamber may be provided to the second pressure chamber by sequentially passing through the ninth hydraulic flow path and the tenth hydraulic flow path.

Another aspect provides an operation method of the electronic brake system according to claim 7, wherein in a normal operation mode, the cut valve and the at least outlet valve are closed, the simulator valve is open, the elastic member is caused to be compressed by the simulation piston according to an operation of the brake pedal, and a reaction force of the elastic member is delivered to a driver as pedal feel.

In an abnormal operation mode, the cut valve and the at least outlet valve may be open, the simulator valve may be closed, the pressurized medium in the simulation chamber may be provided to the first hydraulic circuit through the first backup flow path according to a stepping force of the brake pedal, the pressurized medium in the first mater chamber may be provided to the second hydraulic circuit through the second backup flow path, and the pressurized medium in the second master chamber may be provided to the first backup flow path by sequentially passing through the auxiliary backup flow path and the first backup flow path.

In an inspection mode, the cut valve may be closed, the hydraulic pressure in the hydraulic pressure supply device may be provided to the simulation chamber by passing through the first backup flow path through the first hydraulic circuit, and may be provided to the second master chamber from the first backup flow path through the auxiliary backup flow path.

Advantageous Effects

The electronic brake system according to the present embodiment can reduce the number of parts to be applied and achieve a miniaturization and lightweight of a product.

The electronic brake system according to the present embodiment can effectively implement braking in various operating situations of a vehicle.

The electronic brake system according to the present embodiment can stably generate a high-pressure braking pressure.

The electronic brake system according to the present embodiment can improve performance and operational reliability of the product.

The electronic brake system according to the present embodiment can improve durability of the product by reducing loads applied to components.

The electronic brake system according to the present embodiment can improve easiness of assembly and productivity of the product and reduce a manufacturing cost of the product.

MODE OF THE DISCLOSURE

Hereinafter, an embodiment will be described in detail with reference to the accompanying drawings. The following embodiment is provided to fully convey the spirit to a person having ordinary skill in the art to which the present disclosure belongs. The present disclosure is not limited to the embodiment shown herein but may be embodied in other forms. The drawings are not intended to limit the scope in any way, and the size of components may be exaggerated for clarity of illustration.

Figure 1:
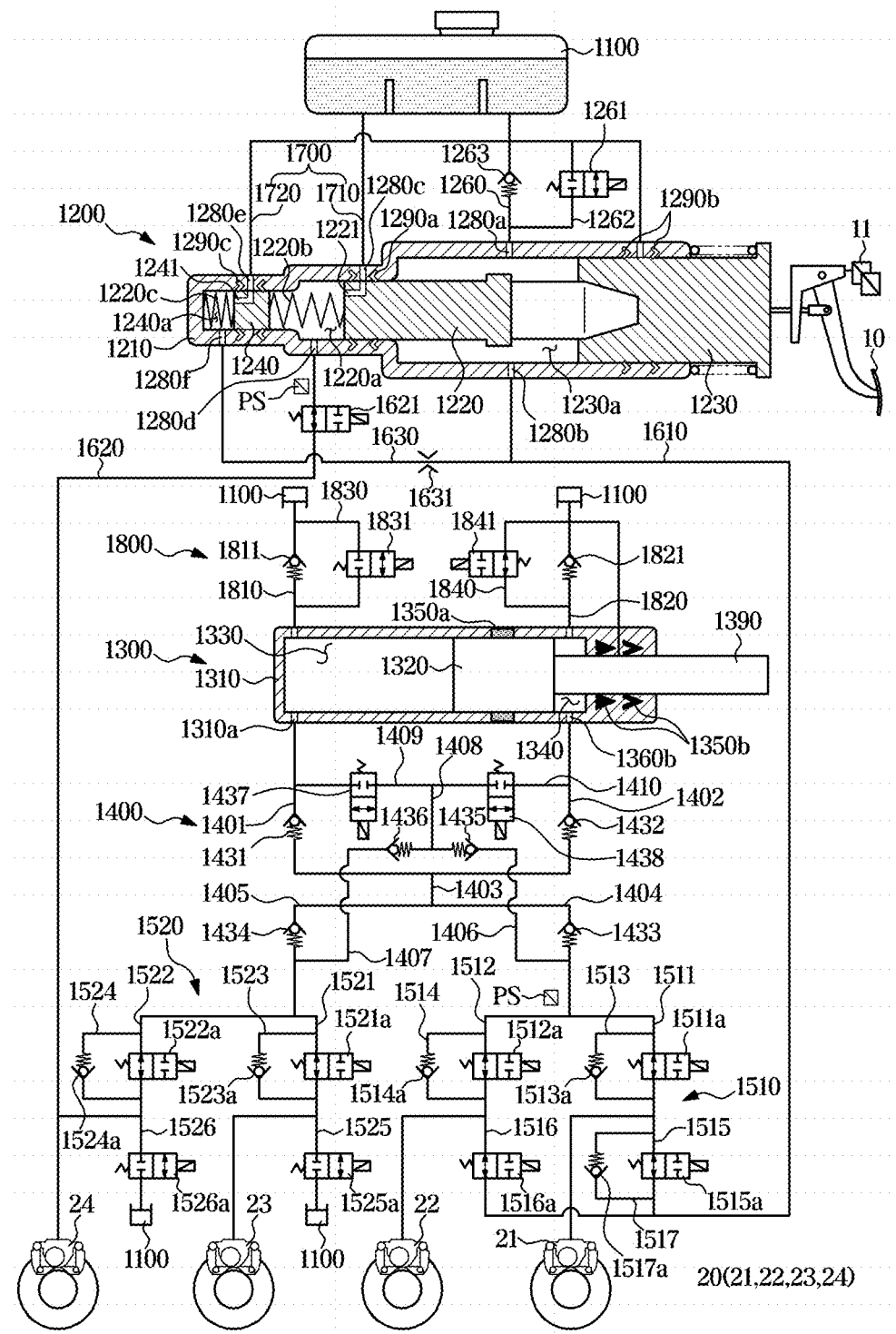
FIG. 1 is a hydraulic circuit diagram illustrating an electronic brake system according to an embodiment.

FIG. 1 is a hydraulic circuit diagram illustrating an electronic brake system 1000 according to an embodiment.

Referring to FIG. 1, the electronic brake system 1000 according to the embodiment includes a reservoir 1100 in which a pressurized medium is stored, an integrated master cylinder 1200 provided to provide a reaction force against pressing of a brake pedal 10 to a driver and pressurize and discharge the pressurized medium such as brake oil accommodated therein, a hydraulic pressure supply device 1300 provided to receive an electrical signal corresponding to a stepping force by a driver from a pedal displacement sensor 11 that detects a displacement of the brake pedal 10 and to generate a hydraulic pressure of the pressurized medium through a mechanical operation, a hydraulic control unit 1400 provided to control the hydraulic pressure provided from the hydraulic pressure supply device 1300, hydraulic circuits 1510 and 1520 having wheel cylinders 20 for braking respective wheels RR, RL, FR, and FL as the hydraulic pressure of the pressurized medium is transferred, a dump controller 1800 provided between the hydraulic pressure supply device 1300 and the reservoir 1100 to control a flow of the pressurized medium, backup flow paths 1610 and 1620 are provided to hydraulically connect the integrated master cylinder 1200 and the hydraulic circuits 1510 and 1520, a reservoir flow path 1700 provided to hydraulically connect the reservoir 1100 and the integrated master cylinder 1200, and an electronic control unit (ECU, not shown) provided to control the hydraulic pressure supply device 1300 and various valves based on hydraulic pressure information and pedal displacement information.

The integrated master cylinder 1200 includes a simulation chamber 1230a and master chambers 1220a and 1240a such that when the driver presses the brake pedal 10 for braking operation, a reaction force against the pressing is provided to the driver to provide a stable pedal feel, and at the same time pressurize and discharge the pressurized medium accommodated therein.

The integrated master cylinder 1200 may be divided into a pedal simulation part to provide a pedal feel to the driver, and a master cylinder part to transfer the pressurized medium to the first hydraulic circuit 1510 side, which will be described below. The integrated master cylinder 1200 may be configured such that the pedal simulation part and the master cylinder part are sequentially provided from the brake pedal 10 side and disposed coaxially within a cylinder block 1210.

Specifically, the integrated master cylinder 1200 may include the cylinder block 1210 having a chamber formed therein, the simulation chamber 1230*a* formed on an inlet side of the cylinder block 1210 to which the brake pedal 10 is connected, a simulation piston 1230 provided in the simulation chamber 1230*a* and connected to the brake pedal 10 to be displaceable depending on the operation of the brake pedal 10, an elastic member 1250 disposed in the simulation chamber 1230*a* to provide a pedal feel through an elastic restoring force generated during compression, a first master piston 1220 provided to be displaceable by a displacement of the simulation piston 1230 or a hydraulic pressure of the pressurized medium accommodated in the simulation chamber 1230*a*, a first master spring 1220*b* provided in the first master chamber 1220*a* and provided to elastically support the first master piston 1220, the second master chamber 1240*a* formed more inside than the first master chamber 1220*a* on the cylinder block 1210, a second master piston 1240 disposed in the second master chamber 1240*a* to be displaceable by a displacement of the first master piston 1220 or a hydraulic pressure of the pressurized medium accommodated in the first master chamber 1220*a*, a second master spring 1220*c* provided in the second master chamber 1240*a* and provided to elastically support the second master piston 1240, and a simulation flow path 1260 provided to connect the simulation chamber 1230*a* to the reservoir 1100.

The simulation chamber 1230*a*, the first master chamber 1220*a*, and the second master chamber 1240*a* may be sequentially formed toward the inside (left side of FIG. 1) from the brake pedal 10 side (right side of FIG. 1) on the cylinder block 1210 of the integrated master cylinder 1200. Also, the simulation piston 1230, the first master piston 1220, and the second master piston 1240 are disposed in the simulation chamber 1230*a*, the first master chamber 1220*a*, and the second master chamber 1240*a*, respectively, to generate a hydraulic pressure or a negative pressure on the pressurized medium accommodated in the respective chambers depending on forward or backward movement.

The simulation chamber 1230*a* may be formed on the inlet side or the outermost side (right side of FIG. 1) of the cylinder block 1210, and the simulation chamber 1230*a* accommodates the simulation piston 1230 connected to the brake pedal 10 via an input rod 12 to enable reciprocating motion.

The simulation chamber 1230*a* may allow a pressurized medium to be introduced thereinto or discharged therefrom through a first hydraulic port 1280*a* and a second hydraulic port 1280*b*. The first hydraulic port 1280*a* is connected to the simulation flow path 1260 such that the pressurized medium is introduced from the reservoir 1100 to the simulation chamber 1230*a*, and the second hydraulic port 1280*b* is connected to a first backup flow path 1610 such that the pressurized medium is discharged from the simulation chamber 1230*a* toward the first backup flow path 1610 or conversely introduced from the first backup flow path 1610 toward the simulation chamber 1230*a*.

The simulation piston 1230 may be provided in the simulation chamber 1230*a* to generate a hydraulic pressure by moving forward (left direction of FIG. 1) to pressurize the pressurized medium accommodated in the simulation chamber 1230*a* or generate a negative pressure inside the simulation chamber 1230*a* by moving backward (right direction of FIG. 1).

In addition, the simulation piston 1230 may press the elastic member 1250 by moving forward, and may return the elastic member 1250 to the original position and shape by moving backward. At least one sealing member 1290*b* may be provided between an inner wall of the cylinder block 1210 and an outer circumferential surface of the simulation piston 1230 to prevent leakage of the pressurized medium.

The first master chamber 1220*a* may be formed at an inner side (left side of FIG. 1) of the simulation chamber 1230*a* on the cylinder block 1210, and the first master piston 1220 may be accommodated in the first master chamber 1220*a* to enable reciprocating movement.

The first mater chamber 1220*a* may allow the pressurized medium to be introduced thereinto and discharged therefrom through a third hydraulic port 1280*c* and a fourth hydraulic port 1280*d*. The third hydraulic port 1280*c* is connected to a first reservoir flow path 1710, which will be described below, so that the pressurized medium accommodated in the first master chamber 1220*a* may be discharged into the reservoir 1100 side, or conversely, the pressurized medium may be introduced from the reservoir 1100. The fourth hydraulic port 1280*d* is connected to the second backup flow path 1620, which will be described below, so that the pressurized medium accommodated in the first master chamber 1220*a* may be discharged into the second hydraulic circuit 1520 side, or conversely, the pressurized medium may be introduced into the first master chamber 1220*a* from the second backup flow path 1620.

At least one sealing member 1290*a* may be provided between an inner wall of the cylinder block 1210 and an outer circumferential surface of the first master piston 1220 to prevent leakage of the pressurized medium between the adjacent chambers.

In addition, the first master chamber 1220*a* may communicate with the reservoir 1100 through a first communication hole 1221 formed through the first master piston 1220.

The first master chamber 1220*a* formed in the cylinder block 1210 may have a diameter smaller than that of the simulation chamber 1230*a*. Therefore, the simulation piston 1230 pressing the simulation chamber 1230*a* may have a diameter larger than that of the first master piston 1220 pressing the first master chamber 1220*a*. This is to compensate for a phenomenon that a hydraulic pressure provided to the first backup flow path 1610 is lower than that provided to the second backup flow path 1620 due to a reaction force of the elastic member 1250 disposed in the simulation chamber 1230 in a fall back mode.

The second master chamber 1240*a* may be formed at an inner side (left side of FIG. 1) of the first master chamber 1220*a* on the cylinder block 1210, and the second master piston 1240 may be accommodated in the second mater chamber 1240*a* to enable reciprocating movement.

The second master chamber 1240*a* may allow the pressurized medium to be introduced thereinto and discharged therefrom through a fifth hydraulic port 1280*e* and a sixth hydraulic port 1280*f*. Specifically, the fifth hydraulic port 1280*e* is connected to a second reservoir flow path 1720, which will be described below, so that the pressurized medium may be introduced into or discharged from the reservoir 1100 to the second master chamber 1240*a* side. The sixth hydraulic port 1280*f* is connected to an auxiliary backup flow path 1630, which will be described below, so that the pressurized medium accommodated in the second master chamber 1240*a* may be discharged into the first backup flow path 1610 side, or conversely, the pressurized medium may be introduced into the second master chamber 1240*a* from the first backup flow path 1610.

The second master piston 1240 may be accommodated in the second master chamber 1240a to generate a hydraulic pressure of the pressurized medium accommodated in the second master chamber 1240a by moving forward, or to generate a negative pressure inside the second master chamber 1240a by moving backward.

At least one sealing member 1290c may be provided between the inner wall of the cylinder block 1210 and an outer circumferential surface of the second master piston 1240 to prevent leakage of the pressurized medium between the adjacent chambers.

In addition, the second master chamber 1240a may communicate with the reservoir 1100 through a second communication hole 1241 formed through the second master piston 1240.

The second master chamber 1240a formed in the cylinder block 1210 may have a diameter smaller than that of the first master chamber 1220a. Therefore, the second master piston 1240 pressing the second master chamber 1240a may have a diameter smaller than that of the first master piston 1220 pressing the first master chamber 1220a. This is to compensate for a phenomenon that a hydraulic pressure provided to the first backup flow path 1610 is lower than that provided to the second backup flow path 1620 due to a reaction force of the elastic member 1250 disposed in the simulation chamber 1230a in a fall back mode.

The elastic member 1250 is interposed between the simulation piston 1230 and the first master piston 1220 and provided to provide a pedal feeling of the brake pedal 10 to the driver by its own elastic restoring force. The elastic member 1250 may be made of a material such as compressible and expandable rubber, and when a displacement occurs in the simulation piston 1230 by the operation of the brake pedal 10, but when the first master piston 1220 is maintained in an original position thereof, the elastic member 1250 is compressed, and the driver may receive a stable and familiar pedal feel by the elastic restoring force of the compressed elastic member 1250.

The first master spring 1220b is interposed between the first master piston 1220 and the second master piston 1240, and when the first master piston 1220 moves forward according to the braking operation to generate a displacement, the first master spring 1220b is compressed, and when the braking is released, the first master spring 1220b allows the first master piston 1220 to return to its original position by the elastic restoring force.

The second master spring 1220c is provided to elastically support the second master piston 1240. The second mater spring 1220c may have one end supported on the cylinder block 1210, and the other end supported on the second master piston 1240, thereby elastically supporting the second master piston 1240. When the second master piston 1240 moves forward according to the braking operation and a displacement occurs, the second master spring 1220c is compressed, and after that, when the braking is released, as the second master spring 1220c expands by an elastic force thereof, the second master piston 1240 may return to the original position.

The simulation flow path 1260 is provided to communicate the simulation chamber 1230a and the reservoir 1100 with each other, and the simulation flow path 1260 may be provided with a simulator check valve 1263 for allowing only one directional flow of the braking fluid.

The simulator check valve 1263 allows only a flow of the braking fluid transferred from the reservoir 1100 toward the simulation chamber 1230a.

The simulation flow path 1260 has a simulator bypass flow path 1262 connected in parallel with respect to the simulator check valve 1263 and provided with a simulator valve 1261 for controlling bidirectional flows of the pressurized medium may be provided in the simulation flow path 1260. The simulator valve 1261 may be provided as a normally closed type solenoid valve that operates to be opened when an electric signal is received from the electronic control unit in a normally closed state.

The reservoir 1100 may accommodate and store the pressurized medium therein. The reservoir 1100 may be connected to each component such as the integrated master cylinder 1200, the hydraulic pressure supply device 1300, which will be described below, and the hydraulic circuits, which will be described below, to supply or receive the pressurized medium. Although a plurality of the reservoirs 1100 is shown with the same reference numeral in the drawings, this is only an example for better understanding of the present disclosure, and the reservoir 1100 may be provided as a single component, or a plurality of the separate and independent reservoirs 1100 may be provided.

The reservoir flow path 1700 is provided to connect the integrated master cylinder 1200 and the reservoir 1100.

The reservoir flow path 1700 may include the first reservoir flow path 1710 connecting the first master chamber 1220a and the reservoir 1100, the second reservoir flow path 1720 connecting the second master chamber 1240a and the reservoir 1100. To this end, one end of the first reservoir flow path 1710 may communicate with the first master chamber 1220a of the integrated master cylinder 1200 and the other end may communicate with the reservoir 1100, one end of the second reservoir flow path 1720 may communicate with the second master chamber 1240a of the integrated master cylinder 1200 and the other end may communicate with the reservoir 1100 while in connection with the simulation flow path 1260. As shown in the drawing, the second reservoir flow path 1720 may be connected to a position in which a side of the simulation flow path 1260 upstream of the simulator check valve 1263 joins the simulator bypass flow path 1262 such that the second reservoir flow path 1720 may communicate with the reservoir 1100 but is not limited thereto, and the reservoir flow paths may be provided as separate flow paths and connected independent of each other.

The hydraulic pressure supply device 1300 is provided to receive an electrical signal corresponding to a stepping force of the driver from the pedal displacement sensor 11 detecting a displacement of the brake pedal 10 and to generate a hydraulic pressure of the pressurized medium through a mechanical operation.

The hydraulic pressure supply device 1300 may include a hydraulic pressure providing unit to provide a pressure to the pressurized medium to be transferred to the wheel cylinders 20, a motor (not shown) to generate a rotational force by an electrical signal from the pedal displacement sensor 11, and a power conversion unit (not shown) to convert a rotational motion of the motor into a linear motion to provide the linear motion to the hydraulic pressure providing unit.

The hydraulic pressure providing unit includes a cylinder block 1310 provided such that the pressurized medium may be accommodated, a hydraulic piston 1320 accommodated in the cylinder block 1310, a sealing member 1350 provided between the hydraulic piston 1320 and the cylinder block 1310 to seal the pressure chambers 1330 and 1340, and a drive shaft 1390 to transfer power output from the power conversion unit to the hydraulic piston 1320.

The pressure chambers 1330 and 1340 may include the first pressure chamber 1330 located in the front of the hydraulic piston 1320 (left direction of the hydraulic piston 1320 in FIG. 1), and the second pressure chamber 1340 located in the rear of the hydraulic piston 1320 (right direction of the hydraulic piston 1320 in FIG. 1). That is, the first pressure chamber 1330 is provided to be partitioned by the cylinder block 1310 and a front surface of the hydraulic piston 1320 so that a volume thereof varies depending on the movement of the hydraulic piston 1320, and the second pressure chamber 1340 is provided to be partitioned by the cylinder block 1310 and a rear surface of the hydraulic piston 1320 so that a volume thereof varies depending on the movement of the hydraulic piston 1320.

The first pressure chamber 1330 is connected to a first hydraulic flow path 1401, which will be described below, through a first communication hole 1360a formed on the cylinder block 1310, and the second pressure chamber 1340 is connected to a second hydraulic flow path 1402, which will be described below, through a second communication hole 1360b formed on the cylinder block 1310.

The sealing members include a piston sealing member 1350a provided between the hydraulic piston 1320 and the cylinder block 1310 to seal between the first pressure chamber 1330 and the second pressure chamber 1340, and a drive shaft sealing member 1350b provided between the drive shaft 1390 and the cylinder block 1310 to seal between the second pressure chamber 1340 and an opening of the cylinder block 1310. The hydraulic pressure or negative pressure of the first pressure chamber 1330 and the second pressure chamber 1340 generated by the forward or backward movement of the hydraulic piston 1320 may not leak by being sealed by the piston sealing member 1350a and the drive shaft sealing member 1350b and may be transferred to the first hydraulic flow path 1401 and the second hydraulic flow path 1402, which will be described below.

The motor (not shown) is provided to generate a driving force of the hydraulic piston 1320 by an electric signal output from the electronic control unit. The motor may include a stator and a rotor, and through this configuration, may provide power to generate a displacement of the hydraulic piston 1320 by rotating in a forward or reverse direction. A rotational angular speed and a rotational angle of the motor may be precisely controlled by a motor control sensor. Because the motor is a well-known technology, a detailed description thereof will be omitted.

The power conversion unit (not shown) is provided to convert a rotational force of the motor into a linear motion. The power conversion unit may be provided as a structure including, for example, a worm shaft (not shown), a worm wheel (not shown), and the drive shaft 1390.

The worm shaft may be integrally formed with a rotation shaft of the motor and may rotate the worm wheel by a worm formed on an outer circumferential surface thereof to be engaged with the worm wheel. The worm wheel may linearly move the drive shaft 1390 by being connected to be engaged with the drive shaft 1390, and the drive shaft 1390 is connected to the hydraulic piston 1320 so that the hydraulic piston 1320 may be slidably moved within the cylinder block 1310.

Explaining the above operations again, when the displacement of the brake pedal 10 is detected by the pedal displacement sensor 11, the detected signal is transferred to the electronic control unit, and the electronic control unit drives the motor to rotate the worm shaft in one direction. The rotational force of the worm shaft is transferred to the drive shaft 1390 via the worm wheel, and the hydraulic piston 1320 connected to the drive shaft 1390 moves forward in the cylinder block 1310, thereby generating a hydraulic pressure in the first pressure chamber 1330.

Conversely, when the stepping force of the brake pedal 10 is released, the electronic control unit drives the motor to rotate the worm shaft in the opposite direction. Accordingly, the worm wheel also rotates in the opposite direction, and the hydraulic piston 1320 connected to the drive shaft 1390 moves backward in the cylinder block 1310, thereby generating a negative pressure in the first pressure chamber 1330.

The generation of a hydraulic pressure and negative pressure in the second pressure chamber 1340 may be implemented by operating opposite to the above operations. That is, when the displacement of the brake pedal 10 is detected by the pedal displacement sensor 11, the detected signal is transferred to the electronic control unit, and the electronic control unit drives the motor to rotate the worm shaft in the opposite direction. The rotational force of the worm shaft is transferred to the drive shaft 1390 via the worm wheel, and the hydraulic piston 1320 connected to the drive shaft 1390 moves backward within the cylinder block 1310, thereby generating a hydraulic pressure in the second pressure chamber 1340.

Conversely, when the stepping force of the brake pedal 10 is released, the electronic control unit drives the motor to rotate the worm shaft in one direction. Accordingly, the worm wheel also rotates in one direction, and the hydraulic piston 1320 connected to the drive shaft 1390 moves forward in the cylinder block 1310, thereby generating a negative pressure in the second pressure chamber 1340.

As such, the hydraulic pressure supply device 1300 may generate a hydraulic pressure or negative pressure in the first pressure chamber 1330 and the second pressure chamber 1340, respectively, depending on the rotation direction of the worm shaft by the operation of the motor, and whether a hydraulic pressure is transferred to the chambers to perform braking, or whether a negative pressure is generated in the chambers to release braking may be determined by controlling the valves. A detailed description thereof will be described below.

The power conversion unit according to the present embodiment is not limited to any one structure as long as it may convert the rotational motion of the motor into the linear motion of the hydraulic piston 1320, and may include devices having various structures and manners.

The hydraulic pressure supply device 1300 may be hydraulically connected to the reservoir 1100 by the dump controller 1800. The dump controller 1800 may include a first dump flow path 1810 connecting the first pressure chamber 1330 and the reservoir 1100, a first bypass flow path 1830 that is branched from the first dump flow path 1810 and then rejoins the first dump flow path 1810, a second dump flow path 1820 connecting the second pressure chamber 1340 and the reservoir 1100, and a second bypass flow path 1840 that is branched from the second dump flow path 1820 and then rejoins the second dump flow path 1820.

A first dump check valve 1811 and a first dump valve 1831 for controlling the flow of the pressurized medium may be provided in the first dump flow path 1810 and the first bypass flow path 1830, respectively. The first dump check valve 1811 may be provided to allow only the flow of the pressurized medium from the reservoir 1100 toward the first pressure chamber 1330 and block the flow of the pressurized medium in the opposite direction. The first dump flow path 1810 has the first bypass flow path 1830 connected thereto in parallel with respect to the first dump check valve 1811, and the first bypass flow path 1830 is provided with the first dump valve 1831 for controlling the flow of the pressurized medium between the first pressure chamber 1330 and the reservoir 1100 may be provided in the first bypass flow path 1830. In other words, the first bypass flow path 1830 may bypass the first dump check valve 1811 on the first dump flow path 1810 to connect a front end and a rear end of the first dump check valve 1811, and the first dump valve 1831 may be provided as a bidirectional solenoid valve for controlling the flow of the pressurized medium between the first pressure chamber 1330 and the reservoir 1100. The first dump valve 1831 may be provided as a normally closed type solenoid valve that operates to be opened when an electric signal is received from the electronic control unit in a normally closed state.

The second dump flow path 1820 and the second bypass flow path 1840 may be provided with a second dump check valve 1821 and a second dump valve 1841, respectively, to control a flow of the pressurized medium. The second dump check valve 1821 may be provided to allow only the flow of the pressurized medium from the reservoir 1100 toward the second pressure chamber 1330 while blocking the flow of the pressurized medium in the opposite direction. The second dump flow path 1820 may have the second bypass flow path 1840 connected thereto in parallel with respect to the second dump check valve 1821, and the second bypass flow path 1840 may be provided with the second dump valve 1841 for controlling the flow of the pressurized medium between the second pressure chamber 1330 and the reservoir 1100. In other words, the second bypass flow path 1840 may bypass the second dump check valve 1831 on the second dump flow path 1820 to connect a front end and a rear end of the second dump check valve 1821, and the second dump valve 1841 may be provided as a bidirectional solenoid valve for controlling the flow of the pressurized medium between the second pressure chamber 1330 and the reservoir 1100. The second dump valve 1841 may be provided as a normally closed type solenoid valve that operates to be closed when an electric signal is received from the electronic control unit in a normally open state.

The hydraulic control unit 1400 may be provided to control a hydraulic pressure transferred to the respective wheel cylinders 20, and the electronic control unit (ECU) is provided to control the hydraulic pressure supply device 1300 and various valves based on the hydraulic pressure information and pedal displacement information.

The hydraulic control unit 1400 may include a first hydraulic circuit 1510 for controlling the flow of the hydraulic pressure to be transferred to first and second wheel cylinders 21 and 22 among the four wheel cylinders, and a second hydraulic circuit 1520 for controlling the flow of the hydraulic pressure to be transferred to third and fourth wheel cylinders 23 and 24, and includes a plurality of flow paths and valves to control the hydraulic pressure to be transferred from the hydraulic pressure supply device 1300 to the wheel cylinders 20.

The first hydraulic flow path 1401 is provided to be in communication with the first pressure chamber 1330, and the second hydraulic flow path 1401 may be provided in communication with the second pressure chamber 1340. The first hydraulic flow path 1401 joins a second hydraulic flow path 1402 at a third hydraulic flow path 1403 and then branches into a fourth hydraulic flow path 1404 connected to the first hydraulic circuit 1510 and a fifth hydraulic flow path 1405 connected to the second hydraulic circuit 1520.

A sixth hydraulic flow path 1406 is provided to communicate with the first hydraulic circuit 1510, and a seventh hydraulic flow path 1407 is provided to communicate with the second hydraulic circuit 1520. The sixth and seventh hydraulic flow paths 1406 and 1407 join at an eighth hydraulic flow path 1408, and then branches into a ninth hydraulic flow path 1409 communicating with the first pressure chamber 1330 and a tenth hydraulic flow path 1410 communicating with the second pressure chamber 1340.

The first hydraulic flow path 1401 may be provided with a first valve 1431 for controlling the flow of the pressurized medium. The first valve 1431 may be provided as a check valve for allowing the flow of the pressurized medium discharged from the first pressure chamber 1330, while blocking the flow of the pressurized medium in the opposite direction. Also, the second hydraulic flow path 1402 may be provided with a second valve 1432 for controlling the flow of the pressurized medium, and the second valve 1432 may be provided as a check valve for allowing the flow of the pressurized medium discharged from the second pressure chamber 1340 while blocking the flow of the pressurized medium in the opposite direction.

The fourth hydraulic flow path 1404 may branch again from the third hydraulic flow path 1403, at which the first hydraulic flow path 1410 and the second hydraulic flow path 1402 join, to be connected to the first hydraulic circuit 1510. The fourth hydraulic flow path 1404 may be provided with a third valve 1433 for controlling the flow of the pressurized medium, and the third valve 1433 may be provided as a check valve for allowing the flow of the pressurized medium from the third hydraulic flow path 1403 toward the first hydraulic circuit 1510 while blocking the flow of the pressurized medium in the opposite direction.

The fifth hydraulic flow path 1405 may branch again from the third hydraulic flow path 1403, at which the first hydraulic flow path 1410 and the second hydraulic flow path 1402 join, to be connected to the second hydraulic circuit 1520. The fifth hydraulic flow path 1405 may be provided with a fourth valve 1434 for controlling the flow of the pressurized medium, and the fourth valve 1434 may be provided as a check valve for allowing the flow of the pressurized medium from the third hydraulic flow path 1403 toward the second hydraulic circuit 1520 while blocking the flow of the pressurized medium in the opposite direction.

The sixth hydraulic flow path 1406 communicates with the first hydraulic circuit 1510, the seventh hydraulic flow path 1407 communicates with the second hydraulic circuit 1520, and the sixth hydraulic flow path 1406 and the seventh hydraulic flow path 1407 are provided to join at the eighth hydraulic flow path 1408. The sixth hydraulic flow path 1406 may be provided with a fifth valve 1435 for controlling the flow of the pressurized medium, and the fifth valve 1435 may be provided as a check valve for allowing the flow of the pressurized medium discharged from the first hydraulic circuit 1510 while blocking the flow of the pressurized medium in the opposite direction. In addition, the seventh hydraulic flow path 1407 may be provided with a sixth fifth valve 1436 for controlling the flow of the pressurized medium, and the sixth valve 1436 may be provided as a check valve for allowing the flow of the pressurized medium discharged from the second hydraulic circuit 1520 while blocking the flow of the pressurized medium in the opposite direction.

The ninth hydraulic flow path 1409 may be provided to branch from the eighth hydraulic flow path 1408, at which the sixth hydraulic flow path 1406 and the seventh hydraulic flow path 1407 join, and connect to the first pressure chamber 1330. The ninth hydraulic flow path 1409 may be provided with a seventh valve 1437 for controlling the flow of the pressurized medium. The seventh valve 1437 may be provided as a bidirectional control valve for controlling the flow of the pressurized medium transferred along the ninth hydraulic flow path 1409. The seventh valve 1437 may be provided as a normally closed type solenoid valve that operates to be opened when an electric signal is received from the electronic control unit in a normally closed state.

The tenth hydraulic flow path 1410 may be provided to branch from the eighth hydraulic flow path 1408, at which the sixth hydraulic flow path 1406 and the seventh hydraulic flow path 1407 join, and connect to the second pressure chamber 1340. The tenth hydraulic flow path 1410 may be provided with an eighth valve 1438 for controlling the flow of the pressurized medium. The eighth valve 1438 may be provided as a bidirectional control valve for controlling the flow of the pressurized medium transferred along the tenth hydraulic flow path 1410. The eighth valve 1438 may be provided as a normally closed type solenoid valve that operates to be opened when an electric signal is received from the electronic control unit in a normally closed state, similar to the seventh valve 1437.

By the arrangement of the hydraulic flow paths and valves of the hydraulic control unit 1400 as described above, the hydraulic pressure generated in the first pressure chamber 1330 according to the forward movement of the hydraulic piston 1320 may be transferred to the first hydraulic circuit 1510 by sequentially passing through the first hydraulic flow path 1401, the third hydraulic flow path 1403, and the fourth hydraulic flow path 1404, and may be transferred to the second hydraulic circuit 1520 by sequentially passing through the first hydraulic flow path 1401, the third hydraulic flow path 1403, and the fifth hydraulic flow path 1405. Also, the hydraulic pressure formed in the second pressure chamber 1340 according to the backward movement of the hydraulic piston 1320 may be transferred to the first hydraulic circuit 1510 by sequentially passing through the second hydraulic flow path 1402, the third hydraulic flow path 1403, and the fourth hydraulic flow path 1404, and may be transferred to the second hydraulic circuit 1520 by sequentially passing through the second hydraulic flow path 1402, the third hydraulic flow path 1403 and the fifth hydraulic flow path 1405.

Conversely, the negative pressure generated in the first pressure chamber 1330 according to the backward movement of the hydraulic piston 1320 may recover the pressurized medium provided in the first hydraulic circuit 1510 to the first pressure chamber 1330 by sequentially passing through the sixth hydraulic flow path 1406, the eighth hydraulic flow path 1408, and the ninth hydraulic flow path 1409, and may recover the pressurized medium provided in the second hydraulic circuit 1520 to the first pressure chamber 1330 by sequentially passing through the seventh hydraulic flow path 1407, the eighth hydraulic flow path 1408, and the ninth hydraulic flow path 1409. Also, the negative pressure generated in the second pressure chamber 1340 according to the forward movement of the hydraulic piston 1320 may recover the pressurized medium provided in the first hydraulic circuit 1510 to the first pressure chamber 1330 by sequentially passing through the sixth hydraulic flow path 1406, the eighth hydraulic flow path 1408, and the tenth hydraulic flow path 1410, and may recover the pressurized medium provided in the second hydraulic circuit 1520 to the second pressure chamber 1340 by sequentially passing through the seventh hydraulic flow path 1407, the eighth hydraulic flow path 1408, and the tenth hydraulic flow path 1410.

In addition, the negative pressure generated in the first pressure chamber 1330 according to the backward movement of the hydraulic piston 1320 may supply the pressurized medium from the reservoir 1100 to the first pressure chamber 1330 through the first dump flow path 1810, and the negative pressure formed in the second pressure chamber 1340 according to the forward movement of the hydraulic piston 1320 may supply the pressurized medium from the reservoir 1100 to the second pressure chamber 1340 through the second dump flow path 1820.

The first hydraulic circuit 1510 of the hydraulic control unit 1400 may control the hydraulic pressure in the first wheel cylinder 21 and the second wheel cylinder 22, which are two wheel cylinders 20 among the four wheels RR, RL, FR, and FL, and the second hydraulic circuit 1520 may control the hydraulic pressure in the third and fourth wheel cylinders 23 and 24 which are the other two wheel cylinders 20.

The first hydraulic circuit 1510 may receive the hydraulic pressure through the fourth hydraulic flow path 1404 and discharge the hydraulic pressure through the sixth hydraulic flow path 1406. To this end, as illustrated in FIG. 1, the fourth hydraulic flow path 1404 and the sixth hydraulic flow path 1406 may be provided to join and then branch into first and second inlet flow paths 1511 and 1512, which are connected to the first wheel cylinder 21 and the second wheel cylinder 22.

Also, the second hydraulic circuit 1520 may receive the hydraulic pressure through the fifth hydraulic flow path 1405 and discharge the hydraulic pressure through the seventh hydraulic flow path 1407, and accordingly, the fifth hydraulic flow path 1405 and the seventh hydraulic flow path 1407 may be provided to join and then branch into third and fourth inlet flow paths 1521 and 1522 connected to the third wheel cylinder 23 and the fourth wheel cylinder 24.

The first and second inlet flow paths 1511 and 1512 may include first and second inlet valves 1511*a* and 1512*a* to control the flow and hydraulic pressure of the pressurized medium to be transferred to the first and second wheel cylinders 21 and 22, and the first and second inlet valves 1511*a* and 1512*a* may be provided as a normally open type solenoid valve that are disposed on upstream sides of the first and second wheel cylinders 21 and 22, respectively.

The first hydraulic circuit 1510 may include first and second check valves 1513*a* and 1514*a* provided to be connected in parallel with respect to the first and second inlet valves 1511*a* and 1512*a*.

The first and second check valves 1513*a* and 1514*a* may be provided in first and second inlet bypass flow paths 1513 and 1514, respectively, that connect front sides and rear sides of the first and second inlet valves 1511*a* and 1512*a* on the first and second inlet flow path 1511 and 1512, and may allow only the flow of pressurized medium from the first and second wheel cylinders 21 and 22 to the hydraulic pressure supply device 1300, while blocking the flow of the pressurized medium from the hydraulic pressure supply device 1300 to the first and second wheel cylinders 21 and 22.

The first and second check valves 1513*a* and 1514*a* may rapidly release the hydraulic pressure of the pressurized medium applied to the first and second wheel cylinders 21 and 22, and even when the first and second inlet valves 1511*a* and 1512*a* do not operate normally, may allow the hydraulic pressure of the braking fluid applied to the first and second wheel cylinders 21 and 22 to be introduced into the hydraulic pressure supply device 1300.

The first hydraulic circuit 1510 may include first and second outlet flow paths 1515 and 1516 that are branched from the first and second inlet flow paths 1511 and 1512, respectively, and connected to the first backup flow path 1610 to improve performance when braking of the first and second wheel cylinders 21 and 22 is released.

The first and second outlet flow paths 1515 and 1516 are branched from the first and second inlet flow paths 1511 and 1512 downstream of the first and second inlet valves 1511*a* and 1512*a*, respectively, and then are connected to the first backup flow path 1610.

The first and second outlet flow paths 1515 and 1516 are provided with first and second outlet valves 1515*a* and 1516*a*, respectively, and the first and second outlet valves 1515*a* and 1516*a* may be provided as normally open type solenoid valves that are connected to the first and second wheel cylinders 21 and 22, respectively, to control a flow of the braking fluid discharged from the first and second wheel cylinders 21 and 22.

The first and second outlet valves 1515*a* and 1516*a* may serve as a cut valve for blocking the hydraulic pressure of the first backup flow path 1610 from being provided to the first and second wheel cylinders 21 and 22.

The first outlet flow path 1515 may be provided with a fifth check valve 1517*a* connected in parallel to the first outlet valve 1515*a*.

The fifth check valve 1517*a* may be provided in a first outlet bypass flow path 1517 that connect a front side and a rear sides of the first outlet valve 1515*a* of the first outlet valve 1515*a* on the first outlet flow path 1515, and may allow only the flow of pressurized medium from the first backup flow path 1610 toward the first wheel cylinder 21. The fifth check valve 1517*a* may allow the hydraulic pressure of the first backup flow path 1610 to be introduced to the first wheel cylinder 21 side even when the first outlet valve 1515*a* does not operate normally in the fallback mode.

The first and second outlet valves 1515*a* and 1516*a* are opened when pressure reduction braking of the first and second wheel cylinders 21 and 22 is required, to control the pressure reduction of the first and second wheel cylinders 21 and 22.

The third and fourth inlet flow paths 1521 and 1522 may include third and third inlet valves 1521*a* and 1522*a* to control the flow and hydraulic pressure of the pressurized medium to be transferred to the third and fourth wheel cylinders 23 and 24. The third and fourth inlet valves 1521*a* and 1522*a* may be provided as a normally open type solenoid valve that are disposed on upstream sides of the third and fourth wheel cylinders 23 and 24, respectively.

The second hydraulic circuit 1520 may include third and fourth check valves 1523*a* and 1524*a* provided to be connected in parallel with respect to the third and fourth inlet valves 1521*a* and 1522*a*, respectively.

The third and fourth check valves 1523*a* and 1524*a* may be provided in third and fourth inlet bypass flow paths 1523 and 1524, respectively, that connect front sides and rear sides of the third and fourth inlet valves 1521*a* and 1522*a* on the third and fourth inlet flow paths 1521 and 1522, and may allow only the flow of pressurized medium from the third and fourth wheel cylinders 23 and 24 to the hydraulic pressure supply device 1300, while blocking the flow of the pressurized medium from the hydraulic pressure supply device 1300 to the third and fourth wheel cylinders 23 and 24.

The third and fourth check valves 1523*a* and 1524*a* may rapidly release the hydraulic pressure of the pressurized medium applied to the third and fourth wheel cylinders 23 and 24, and even when the third and fourth inlet valves 1521*a* and 1522*a* do not operate normally, allow the hydraulic pressure of the pressurized medium applied to the third and fourth wheel cylinders 23 and 24 to be introduced into the hydraulic pressure supply device 1300.

The second hydraulic circuit 1520 may include third and fourth outlet flow paths 1525 and 1526 that are branched from the third and fourth inlet flow paths 1521 and 1522, respectively, and connected to the reservoir 1100 to improve performance when braking of the third and fourth wheel cylinders 23 and 24 is released.

The third and fourth outlet flow paths 1525 and 1526 may be branched from the third and fourth inlet flow paths 1521 and 1522 downstream of the third and fourth inlet valves 1521*a* and 1522*a*, respectively, and then are connected to the reservoir 1100.

The third and fourth outlet flow paths 1525 and 1526 are provided with third and fourth outlet valves 1525*a* and 1526*a*, respectively, and the third and fourth outlet valves 1525*a* and 1526*a* may be provided as normally closed type solenoid valves that are connected to the third and fourth wheel cylinders 23 and 24, respectively, to control a flow of the braking fluid discharged from the third and fourth wheel cylinders 23 and 24.

The third and fourth outlet valves 1525*a* and 1526*a* are opened when pressure reduction braking of the first and second wheel cylinders 21 and 22 is required, to control the pressure reduction of the first and second wheel cylinders 21 and 22.

On the other hand, the fourth inlet flow path 1522 is connected to the second backup flow path 1620, and is supplied with a hydraulic pressure of the first master chamber 1220*a* through the second backup flow path 1620.

The electronic brake system 1000 according to the present embodiment may include the first and second backup flow paths 1610 and 1620 and the auxiliary backup flow path 1630 to implement braking by directly supplying the pressurized medium discharged from the integrated master cylinder 1200 to the wheel cylinders 20 when the normal operation is impossible due to a device failure or the like. A mode in which the hydraulic pressure in the integrated master cylinder 1200 is directly transferred to the wheel cylinders 20 is referred to as an abnormal operation mode, that is, a fallback mode.

The first backup flow path 1610 may be provided to connect the simulation chamber 1230*a* of the integrated master cylinder 1200 to the first hydraulic circuit 1510, and the second backup flow path 1620 may be provided to connect the first master chamber 1220*a* of the integrated master cylinder 1200 to the second hydraulic circuit 1520. The auxiliary backup flow path 1630 is provided to connect the second master chamber 1240*a* of the integrated master cylinder 1200 to the first backup flow path 1620.

Specifically, the first backup flow path 1610 may have one end connected to the simulation chamber 1230*a* and the other end connected to the first outlet flow path 1515 downstream of the first outlet valve 1515*a* and the first outlet flow path 1516 downstream of the second outlet vale 1516*a* on the first hydraulic circuit 1510, and the second backup flow path 1620 may have one end connected to the first master chamber 1220*a* and the other end connected to the fourth inlet flow path 1522 downstream of the fourth inlet valve 1522*a* on the second hydraulic circuit 1520. In addition, the auxiliary backup flow path 1630 has one end connected to the second mater chamber 1240*a* and the other end provided to join the first backup flow path 1610, so that the pressurized medium accommodated in the second master chamber 1240*a* may be transferred to the first backup flow path 1610.

The second backup flow path 1620 may be provided with a cut valve 1621 for controlling bidirectional flows of the pressurized medium. The cut valve 1621 may be provided as a normally open type solenoid valves that operate to be closed when a closing signal is received from the electronic control unit in a normally open state.

The auxiliary backup flow path 1630 may be provided with an orifice 1631 that allows the flow of the pressurized medium when a hydraulic pressure exceeds a predetermined level.

Accordingly, when the cut valve 1621 and the first and second outlet valves 1515a and 1516a are closed, the pressurized medium in the integrated master cylinder 1200 may be prevented from being directly transferred to the wheel cylinders 20, and at the same time the hydraulic pressure provided from the hydraulic pressure supply device 1300 may be supplied to the first and second hydraulic circuits 1510 and 1520 side through the hydraulic control unit 1400, and when the cut valve 1621 and the first and second outlet valves 1515a and 1516a are opened, the pressurized medium pressurized in the integrated master cylinder 1200 may be directly supplied to the first and second hydraulic circuits 1510 and 1520 side through the first and second backup flow paths 1610 and 1620 and the auxiliary backup flow path 1630, thereby performing braking.

The electronic brake system 1000 according to the present embodiment may include a pressure sensor PS to detect a hydraulic pressure in at least one of the first hydraulic circuit 1510 and the second hydraulic circuit 1520.

Hereinafter, a pedal simulation operation of an electronic brake system according to an embodiment will be described.

Figure 2:
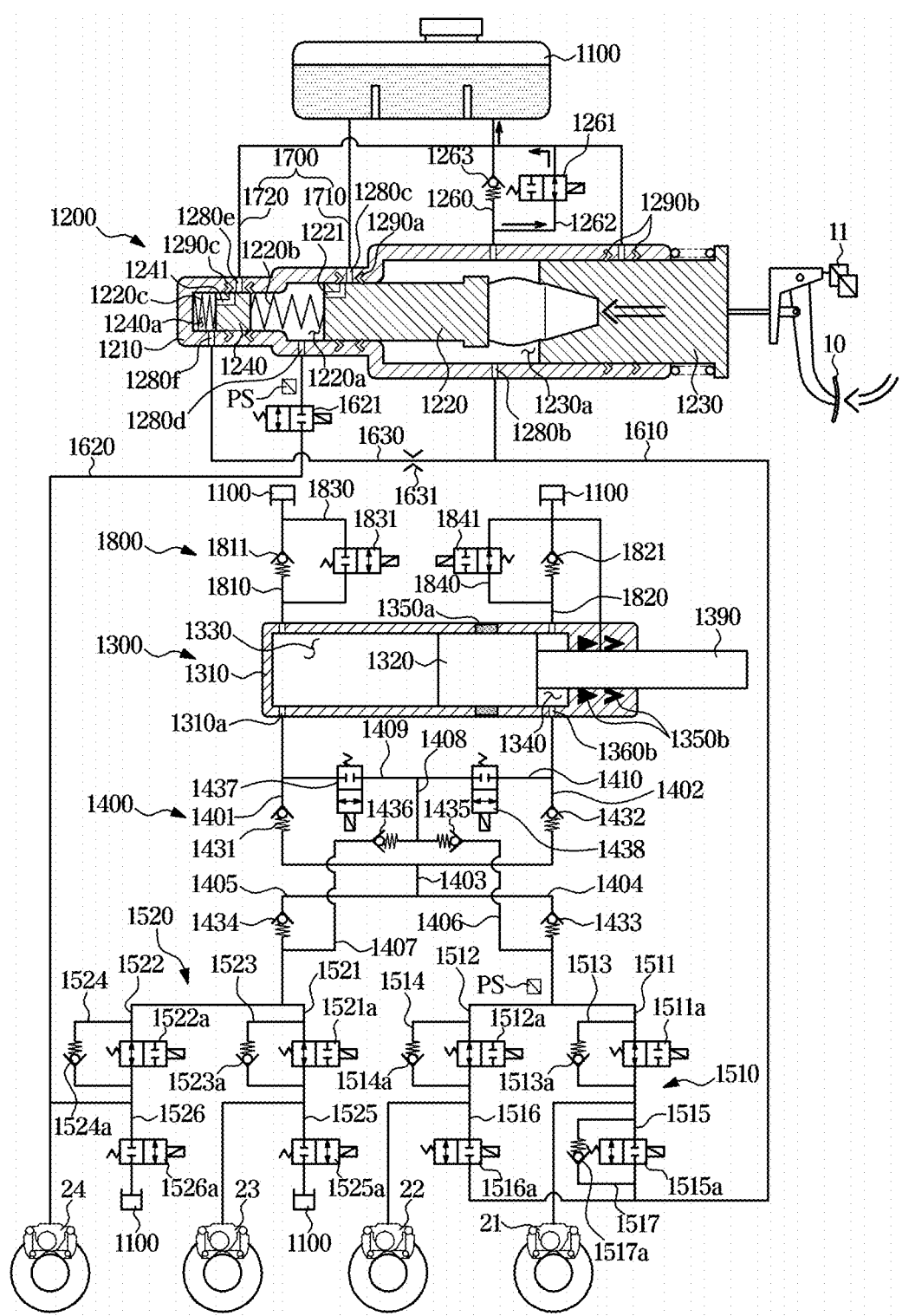
FIG. 2 is a hydraulic circuit diagram illustrating an operation state of a pedal simulator of an electronic brake system according to an embodiment.

FIG. 2 is a diagram illustrating an operation state of a pedal simulator of an electronic brake system according to an embodiment.

Referring to FIG. 2, describing a pedal simulation operation of the integrated master cylinder 1200, in a normal operation, at the same time when the driver operates the brake pedal 10, the cut valve 1621 provided in the second backup flow path 1620 and the first and second outlet valves 1515a and 1516a, which are to be described below, are closed while the simulator valve 1261 is opened.

As the operation of the brake pedal 10 progresses, the simulation piston 1230 moves forward to allow the elastic member 1250 to be compressed, and the elastic restoring force generated by the compression of the elastic member 1250 is provided to the driver as a pedal feeling.

In this case, the first master chamber 1220a and the second master chamber 1240a are sealed by closing operations of the first and second outlet valves 1515a and 1516a, so that a displacement does not occur in the first mater piston 1220 and the second mater piston 1260. However, the pressurized medium accommodated in the simulation chamber 1230a is transferred to the reservoir 1100 through the simulation flow path 1260, which causes the simulation piston 1230 to move forward to generate a displacement, and the simulation piston 1230 compresses the elastic member 1250.

After that, when the driver releases the pedaling force of the brake pedal 10, the simulation piston 1230 is caused to return to its original position by the restoring force of the elastic member 1250.

Hereinafter, an operation method of the electronic brake system 1000 according to the present embodiment will be described.

The operation of the electronic brake system 1000 according to the present embodiment may include the normal operation mode in which various devices and valves operate normally without failure or malfunction, the abnormal operation mode (fallback mode) in which various devices and valves operate abnormally by failure or malfunction, and the inspection mode of inspecting whether a leak occurs in the integrated master cylinder 1200 or the simulation valve 1261.

First, the normal operation mode among the operating methods of the electronic brake system 1000 according to the present embodiment will be described.

The normal operation mode of the electronic brake system 1000 according to the present embodiment may be divided into a first braking mode to a third braking mode as the hydraulic pressure transferred from the hydraulic pressure supply device 1300 to the wheel cylinders 20 increases. Specifically, in the first braking mode, the hydraulic pressure by the hydraulic pressure supply device 1300 may be primarily provided to the wheel cylinders 20, and in the second braking mode, the hydraulic pressure by the hydraulic pressure supply device 1300 may be secondarily provided to the wheel cylinders 20 to transfer a higher braking pressure than in the first braking mode, and in the third braking mode, the hydraulic pressure by the hydraulic pressure supply device 1300 may be thirdly provided to the wheel cylinders 20 to transfer a higher braking pressure than in the second braking mode.

The first to third braking modes may be changed by changing the operations of the hydraulic pressure supply device 1300 and the hydraulic control unit 1400. The hydraulic pressure supply device 1300 may provide a sufficiently high hydraulic pressure of the pressurized medium without a high specification motor 120 by utilizing the first to third braking modes, and furthermore, may prevent unnecessary loads applied to the motor. Therefore, a stable braking force may be secured while reducing the cost and weight of the brake system, and durability and operational reliability of the devices may be improved.

Figure 3:
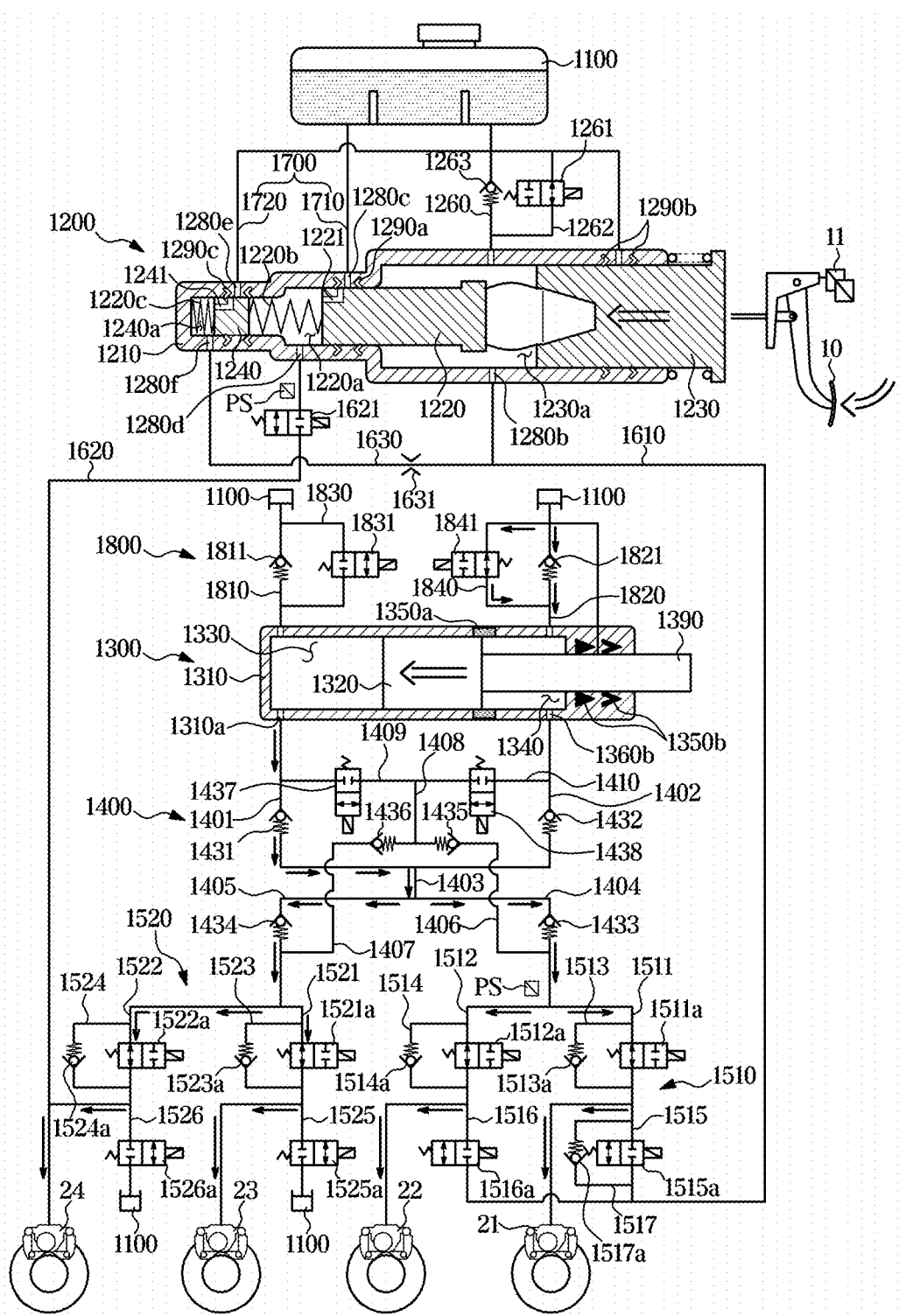
FIG. 3 is a hydraulic circuit diagram illustrating that am electronic brake system according to an embodiment performs a first braking mode.

FIG. 3 is a hydraulic circuit diagram illustrating that the electronic brake system 1000 according the present disclosure performs the first braking mode.

Referring to FIG. 3, when the driver depresses the brake pedal 10 at the beginning of braking, the motor (not shown) operates to rotate in one direction, the rotational force of the motor is transferred to the hydraulic pressure providing unit by the power conversion unit, and the hydraulic piston 1320 of the hydraulic pressure providing unit moves forward, thereby generating a hydraulic pressure in the first pressure chamber 1330. The hydraulic pressure discharged from the first pressure chamber 1330 is transferred to the respective wheel cylinders 20 through the hydraulic control unit 1400, the first hydraulic circuit 1510 and the second hydraulic circuit 1520, thereby generating a braking force.

Specifically, the hydraulic pressure generated in the first pressure chamber 1330 is primarily transferred to the first wheel cylinder 21 and the second wheel cylinder 22 provided in the first hydraulic circuit 1510 by sequentially passing through the first hydraulic flow path 1401, the third hydraulic flow path 1403, and the fourth hydraulic flow path 1404. In this case, as the first valve 1431 is provided as a check valve for allowing only the flow of the pressurized medium discharged from the first pressure chamber 1330 and the third valve 1433 is provided as a check valve for allowing only the flow of the pressurized medium transmitted from the third hydraulic circuit 1403 toward the first hydraulic circuit 1510, the hydraulic pressure of the pressurized medium may be smoothly transferred to the first and second wheel cylinders 21 and 22. Also, the first inlet valve 1511a and the second inlet valve 1512a provided in the first hydraulic circuit 1510 are maintained in an open state, and the first outlet valve 1515a and the second outlet valve 1516a are maintained in a closed state, thereby preventing the hydraulic pressure of the pressurized medium from leaking into the reservoir 1100 side.

The hydraulic pressure generated in the first pressure chamber 1330 is primarily transferred to the third and fourth wheel cylinders 23 and 24 provided in the second hydraulic circuit 1520 by sequentially passing through the first hydraulic flow path 1401, the third hydraulic flow path 1403, and the fifth hydraulic flow path 1405. As described above, as the first valve 1431 is provided as a check valve for allowing only the flow of the pressurized medium discharged from the first pressure chamber 1330 and the fourth valve 1434 is provided as a check valve for allowing only the flow of the pressurized medium from the third hydraulic flow path 1403 toward the second hydraulic circuit 1520, the hydraulic pressure of the pressurized medium may be smoothly transferred to the third and fourth wheel cylinders 23 and 24. Also, the third inlet valve 1521a and the fourth inlet valve 1522a provided in the second hydraulic circuit 1520 are maintained in an open state, and the third and fourth outlet valves 1525a and 1526a and the cut valve 1621 are maintained in a closed state, thereby preventing the hydraulic pressure of the pressurized medium from leaking to a side of the second backup flow path 1620 and the reservoir 1100.

Because, in the first braking mode, the seventh valve 1437 and the eighth valve 1438 are in a closed state, the hydraulic pressure of the pressurized medium generated in the first pressure chamber 1330 may be prevented from leaking into the second pressure chamber 1340. In addition, the first dump valve 1831 provided in the first bypass flow path 1830 is maintained in a closed state, thereby preventing the hydraulic pressure formed in the first pressure chamber 1330 from leaking into the reservoir 1100.

On the other hand, as the hydraulic piston 1320 moves forward, negative pressure is generated in the second pressure chamber 1340, and the hydraulic pressure of the pressurized medium is transferred from the reservoir 1100 to the second pressure chamber 1340 through the second dump flow path 1820 to prepare the second braking mode to be described below. Since the second dump check valve 1821 provided in the second dump flow path 1820 allows the flow of the pressurized medium from the reservoir 1100 to the second pressure chamber 1340, the pressurized medium may be stably supplied to the second pressure chamber 1340, and the second dump valve 1841 provided in the second bypass flow path 1840 may be switched to an open state to rapidly supply the pressurized medium from the reservoir 1100 to the second pressure chamber 1340.

In the first braking mode in which braking of the wheel cylinders 20 is performed by the hydraulic pressure supply device 1300, the cut valve 1621 and first and second outlet valves 1515a and 1516a are switched to be closed, so that the pressurized medium discharged from the integrated master cylinder 1200 is prevented from being transferred to the wheel cylinders 20 side. In this case, the integrated master cylinder 1200 performs the above-described pedal simulator operation.

Figure 4:
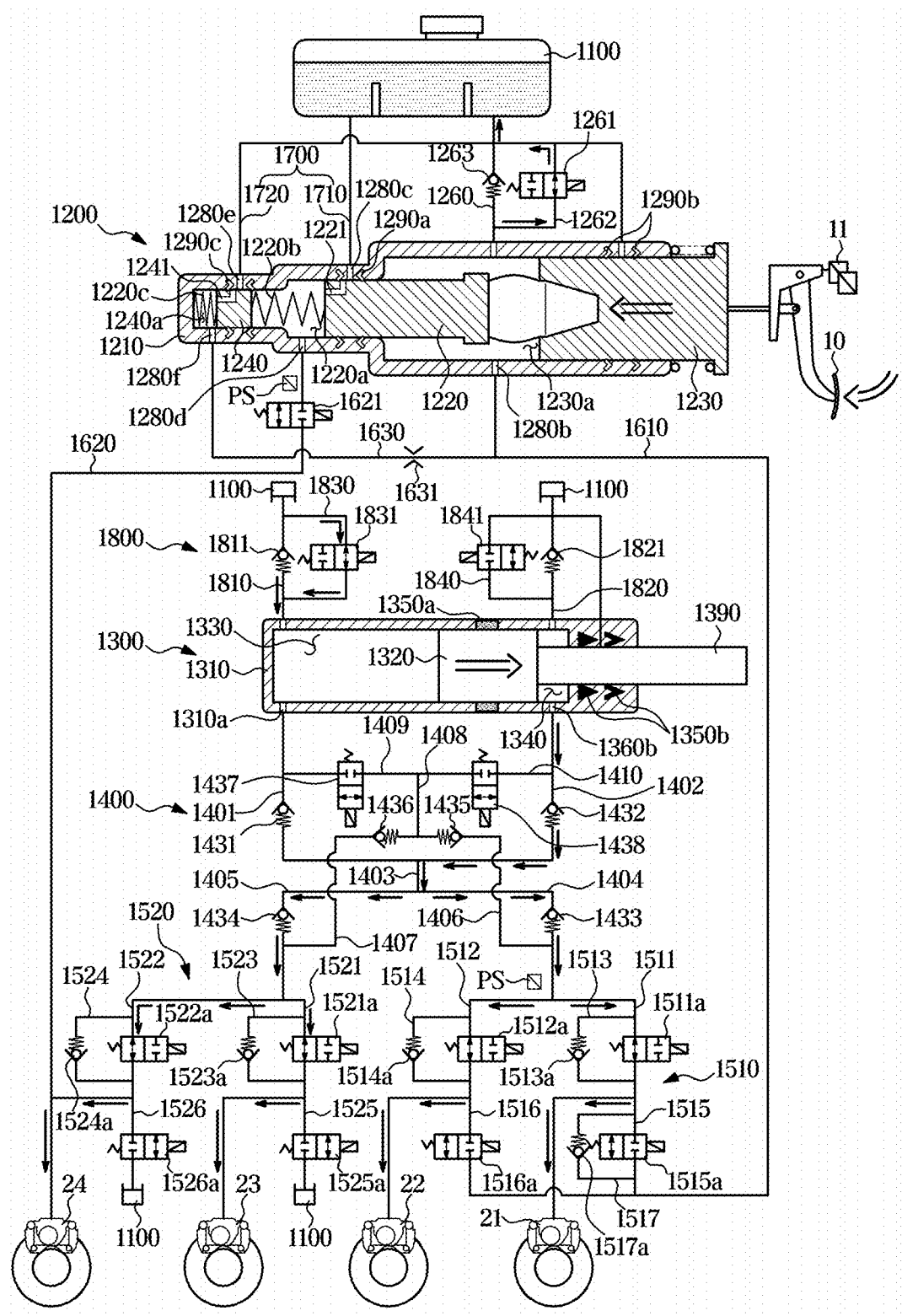
FIG. 4 is a hydraulic circuit diagram illustrating that an electronic brake system according to an embodiment performs a second braking mode.

The electronic brake system 1000 according to the present embodiment may switch from the first braking mode to the second braking mode shown in FIG. 4 when a braking pressure higher than that in the first braking mode is to be provided.

FIG. 4 is a hydraulic circuit diagram illustrating that the electronic brake system 1000 according to the present embodiment performs the second braking mode, and referring to FIG. 4, when a displacement or an operating speed of the brake pedal 10 detected by the pedal displacement sensor 11 is higher than a preset level or a hydraulic pressure detected by the pressure sensor is higher than a preset level, the electronic control unit may switch from the first braking mode to the second braking mode by determining that a higher braking pressure is required.

When the first braking mode is switched to the second braking mode, the motor operates to rotate in the other direction, and the rotational force of the motor is transferred to the hydraulic pressure providing unit by the power conversion unit so that the hydraulic piston 1320 moves backward, thereby generating a hydraulic pressure in the second pressure chamber 1340. The hydraulic pressure discharged from the second pressure chamber 1340 is transferred to the respective wheel cylinders 20 through the hydraulic control unit 1400, the first hydraulic circuit 1510, and the second hydraulic circuit 1520, thereby generating a braking force.

Specifically, the hydraulic pressure generated in the second pressure chamber 1340 is secondarily transferred to the first wheel cylinder 21 and the second wheel cylinder 22 provided in the first hydraulic circuit 1510 by sequentially passing through the second hydraulic flow path 1402, the third hydraulic flow path 1403, and the fourth hydraulic flow path 1404. In this case, the second valve 1432 provided in the second hydraulic flow path 1402 is provided as a check valve for allowing only the flow of the pressurized medium from the second pressure chamber 1340, and the third valve 1433 provided in the fourth hydraulic flow path 1404 is provided as a check valve for allowing only the flow of the pressurized medium from the third hydraulic flow path 1403 toward the first hydraulic circuit 1510, the hydraulic pressure of the pressurized medium may be smoothly transferred to the first wheel cylinder 21 and the second wheel cylinder 22. The first inlet valve 1511a and the second inlet valve 1512a provided in the first hydraulic circuit 1510 are maintained in the open state, and the first outlet valve 1515a and the second outlet valve 1516a are maintained in the closed state, thereby preventing the hydraulic pressure of the pressurized medium from leaking into the first backup flow path 1610 side.

Also, the hydraulic pressure generated in the second pressure chamber 1340 is secondarily transferred to the third wheel cylinder 23 and the fourth wheel cylinder 24 provided in the second hydraulic circuit 1520 by sequentially passing through the second hydraulic flow path 1402, the third hydraulic flow path 1403, and the fifth hydraulic flow path 1405. As described above, since the second valve 1432 provided in the second hydraulic flow path 1403 allows only the flow of the pressurized medium discharged from the second pressure chamber 1340, and the fourth valve 1434 provided in the fifth hydraulic flow path 1405 is provided as a check valve for allowing only the flow of the pressurized medium from the third hydraulic flow path 1430 toward the second hydraulic circuit 1520, the hydraulic pressure of the pressurized medium may be smoothly transferred to the third wheel cylinder 23 and the fourth wheel cylinder 24. The third inlet valve 1521a and the fourth inlet valve 1522a provided in the second hydraulic circuit 1520 are maintained in the open state, and the cut valve 1621 is maintained in the closed state, thereby preventing the hydraulic pressure of the pressurized medium from leaking into the reservoir 1100 side.

In the second braking mode, since the seventh valve 1437 and the eighth valve 1438 are controlled to be a closed state, the hydraulic pressure of the pressurized medium generated in the second pressure chamber 1340 may be prevented from leaking into the first pressure chamber 1330. In addition, the second dump valve 1841 is switched to a closed state to prevent the hydraulic pressure of the pressurized medium generated in the second pressure chamber 1340 from leaking into the reservoir 1100 side.

On the other hand, as the hydraulic piston 1320 moves backward, negative pressure is generated in the first pressure chamber 1330, the hydraulic pressure of the pressurized medium is transferred from the reservoir 1100 to the first pressure chamber 1330 through the first dump flow path 1810 to prepare the third braking mode to be described below. Since the first dump check valve 1811 provided in the first dump flow path 1810 allows the flow of the pressurized medium from the reservoir 1100 to the first pressure chamber 1330, the pressurized medium may be stably supplied to the first pressure chamber 1330, and the first dump valve 1831 provided in the first bypass flow path 1830 is switched to an open state to rapidly supply the pressurized medium from the reservoir 1100 to the first pressure chamber 1330.

Because an operation of the integrated master cylinder 1200 in the second braking mode is same as the operation of the integrated master cylinder 1200 of the electronic brake system in the first braking mode described above, in order to prevent redundant description, a description thereof will be omitted.

Figure 5:
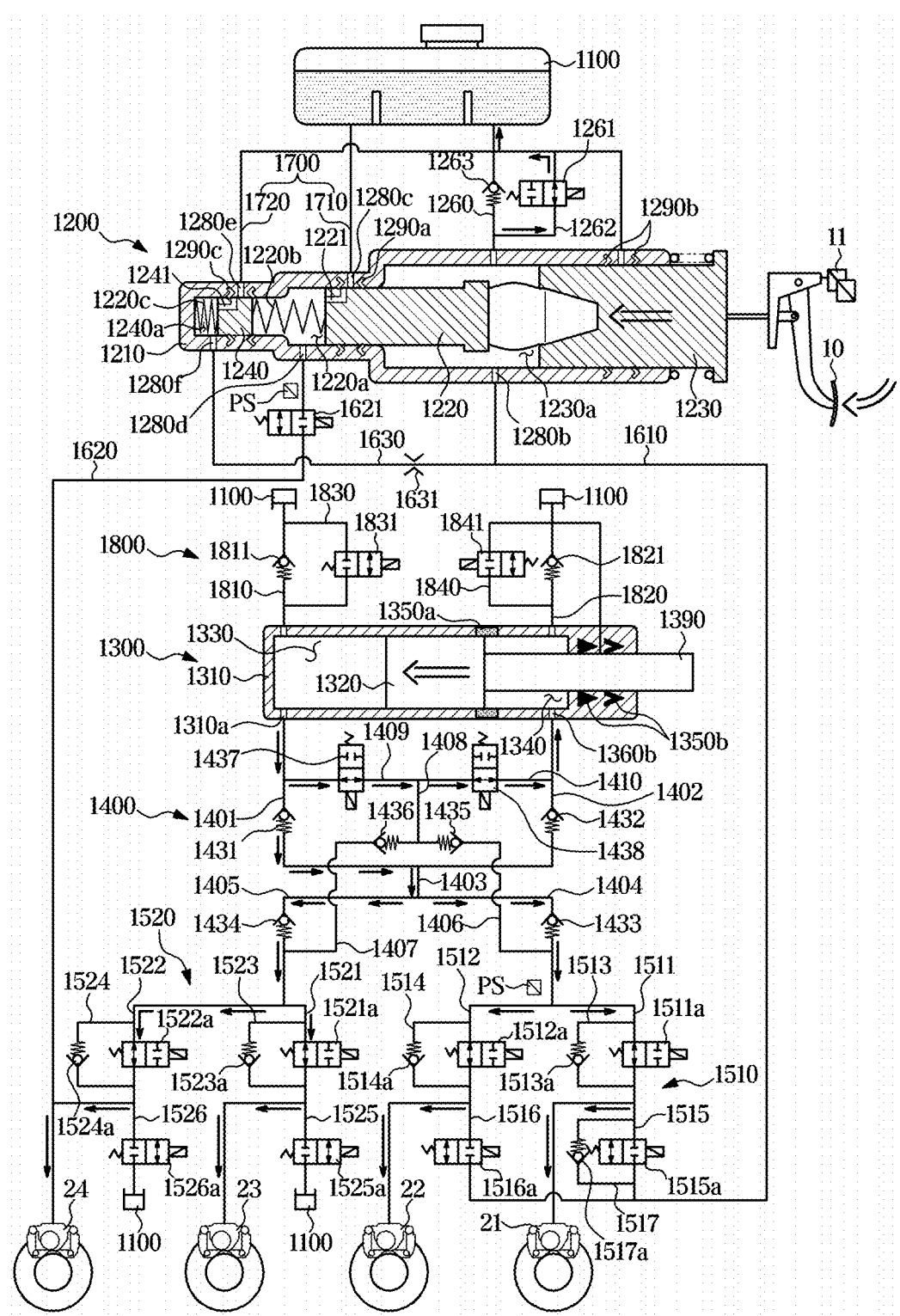
FIG. 5 is a hydraulic circuit diagram illustrating that an electronic brake system according to an embodiment performs a third braking mode.

The electronic brake system 1000 according to the embodiment of the present disclosure may switch from the second braking mode to the third braking mode shown in FIG. 5 when a braking pressure higher than that in the second braking mode is to be provided.

FIG. 5 is a hydraulic circuit diagram illustrating that an electronic brake system 1000 according to an embodiment performs the third braking mode.

Referring to FIG. 5, when a displacement or an operating speed of the brake pedal 10 detected by the pedal displacement sensor 11 is higher than the preset level or a hydraulic pressure detected by the pressure sensor is higher than the preset level, the electronic control unit may switch from the second braking mode to the third braking mode by determining that a higher braking pressure is required.

When the second braking mode is switched to the third braking mode, the motor operates to rotate in one direction, and the rotational force of the motor is transferred to the hydraulic pressure providing unit by the power conversion unit, and the hydraulic piston 1320 of the hydraulic pressure providing unit moves forward again, thereby generating a hydraulic pressure in the first pressure chamber 1330. The hydraulic pressure discharged from the first pressure chamber 1330 is transferred to the respective wheel cylinders 20 through a hydraulic control unit 3400, the first hydraulic circuit 1510, and the second hydraulic circuit 1520, thereby generating a braking force.

Specifically, a part of the hydraulic pressure generated in the first pressure chamber 1330 is thirdly transferred to the first wheel cylinder 21 and the second wheel cylinder 22 provided in the first hydraulic circuit 1510 by sequentially passing through the first hydraulic flow path 1401, the third hydraulic flow path 1403, and the fourth hydraulic flow path 1404. In this case, as the first valve 1431 is provided as a check valve for allowing only the flow of the pressurized medium discharged from the first pressure chamber 1330, and the third valve 1433 is provided as a check valve for allowing only the flow of the pressurized medium from the third hydraulic flow path 1403 toward the first hydraulic circuit 1510, so that the hydraulic pressure of the pressurized medium may be smoothly transferred to the first and second wheel cylinders 21 and 22. In addition, the first inlet valve 1511a and the second inlet valve 1512a provided in the first hydraulic circuit 1510 are maintained in the open state, and the first outlet valve 1515a and the second outlet valve 1516a are maintained in the closed state, thereby preventing the hydraulic pressure of the pressurized medium from leaking into the first backup flow path 1610 side.

In addition, a part of the hydraulic pressure generated in the first pressure chamber 1330 is thirdly transferred to the third wheel cylinder 23 and the fourth wheel cylinder 24 provided in the second hydraulic circuit 1520 by sequentially passing through the first hydraulic flow path 1401, the third hydraulic flow path 1403, and the fifth hydraulic flow path 1405. As described above, since the first valve 1431 is provided as a check valve for allowing only the flow of the pressurized medium discharged from the first pressure chamber 1330, and the fourth valve 1434 is provided as a check valve for allowing only the flow of the pressurized medium from the third hydraulic flow path 1403 toward the second hydraulic circuit 1520, so that the hydraulic pressure of the pressurized medium may be smoothly transferred to the third and fourth wheel cylinders 23 and 24. In addition, the third inlet valve 1521a and the fourth inlet valve 1522a provided in the second hydraulic circuit 1520 are maintained in the open state, and the cut valve 1621 is maintained in the closed state, thereby preventing the hydraulic pressure of the pressurized medium from leaking into the reservoir 1100 side.

Because the third braking mode refers a state in which the pressurized medium of a high pressure is provided, as the hydraulic piston 1320 moves forward, a force of the hydraulic pressure in the first pressure chamber 1330 to move the hydraulic piston 1320 backward also increases, so that a load applied to the motor increases rapidly. Accordingly, in the third braking mode, the seventh valve 1437 and the eighth valve 1438 operate to be opened, thereby allowing the flow of the pressurized medium through the ninth hydraulic flow path 1409 and the tenth hydraulic flow path 1410. In other words, a part of the hydraulic pressure generated in the first pressure chamber 1330 is supplied to the second pressure chamber 1340 by sequentially passing through the ninth hydraulic flow path 1409 and the tenth seventh hydraulic flow path 1410, and through this, the first pressure chamber 1330 and the second pressure chamber 1340 communicate with each other to synchronize the hydraulic pressure, so that the load applied to the motor may be reduced and the durability and reliability of the devices may be improved.

In the third braking mode, the first dump valve 1831 is switched to the closed state, so that the hydraulic pressure of the pressurized medium generated in the first pressure chamber 1330 may be prevented from leaking into the reservoir 1100 along the first bypass flow path 1830, and the second dump valve 2841 is also controlled to be closed, so that as a negative pressure is rapidly generated in the second pressure chamber 1340 by the forward movement of the hydraulic piston 1320, the pressurized medium provided from the first pressure chamber 1330 may be smoothly supplied to the second pressure chamber 1340.

Because an operation of the integrated master cylinder 1200 in the third braking mode is same as the operation of the integrated master cylinder 1200 of the electronic brake system in the first and second braking modes described above, in order to prevent redundant description, a description thereof will be omitted.

On the other hand, the braking pressures of the wheel cylinder 20 in the first and third braking modes are detected, and when pressure reduction braking, such as an anti-lock braking (ABS) dump mode, is required, the first and second outlet valves 1515a and 1516a provided in the first hydraulic circuit 1510 are selectively opened such that the pressurized medium of the first and second wheel cylinders 21 and 22 is recovered to the reservoir 1100 through the first backup flow path 1610 and the simulation chamber 1230a, and the pressurized medium of the second and second wheel cylinders 23 and 24 is recovered to the reservoir 1100 through the third and fourth outlet valves 1525a and 1526a provided in the second hydraulic circuit 1520.

Hereinafter, an operation method of the electronic brake system 1000 according to the present embodiment in which the braking is released from the normal operation mode will be described.

Figure 6:
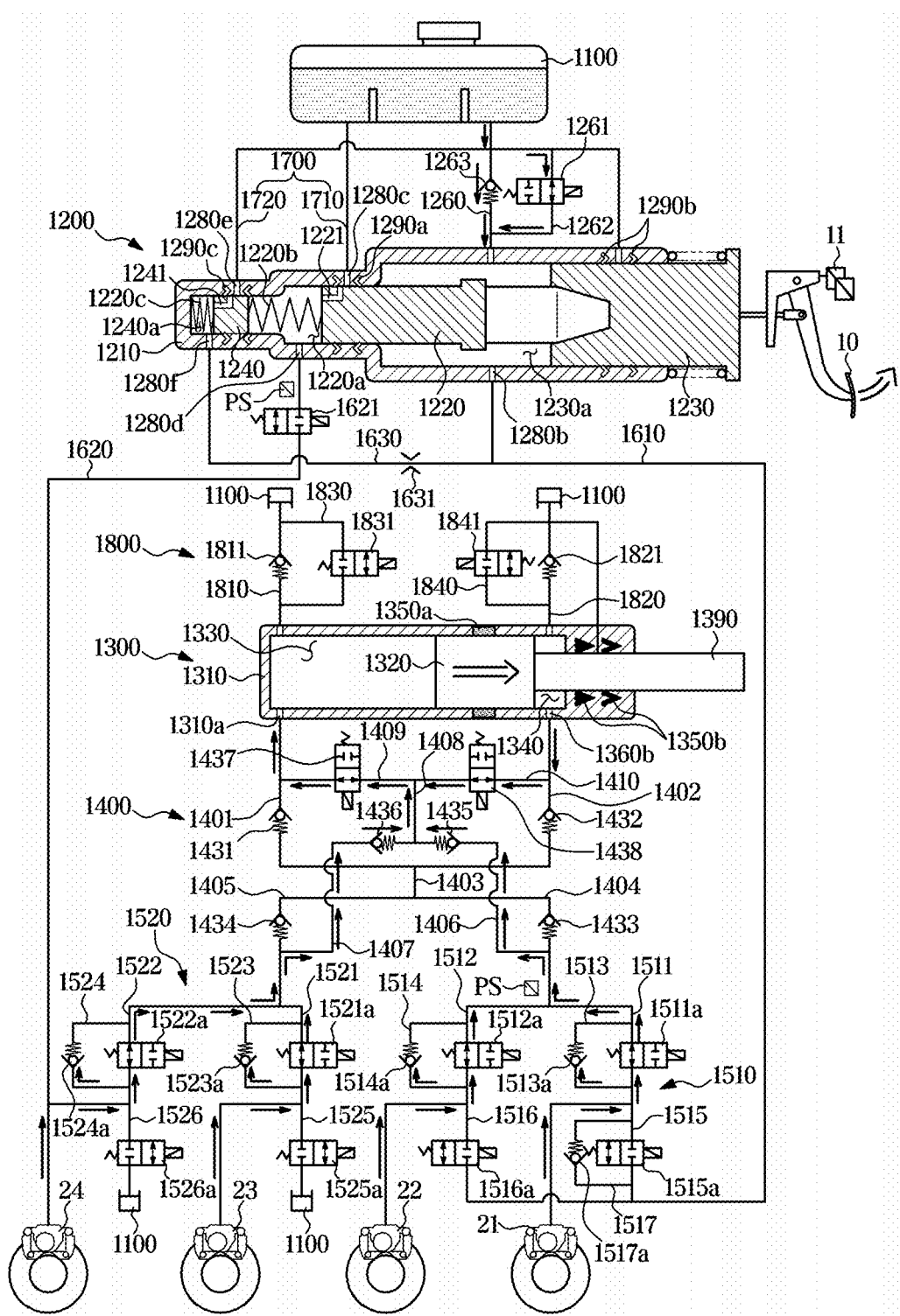
FIG. 6 is a hydraulic circuit diagram illustrating that an electronic brake system according to an embodiment releases a third braking mode.

FIG. 6 is a hydraulic circuit diagram illustrating that the hydraulic piston 1320 of the electronic brake system 1000 according to the present embodiment moves backward to release the third braking mode.

Referring to FIG. 6, when the stepping force applied to the brake pedal 10 is released, the motor generates a rotational force in the other direction and transfers the rotational force to the power conversion unit, and the power conversion unit moves the hydraulic piston 1320 backward. Accordingly, the hydraulic pressure in the first pressure chamber 140 is released, and at the same time, a negative pressure may be generated, so that the pressurized medium in the wheel cylinders 20 may be transferred to the first pressure chamber 1330.

Specifically, the hydraulic pressure of the first wheel cylinder 21 and the second wheel cylinder 22 provided in the first hydraulic circuit 1510 is recovered to the first pressure chamber 1330 by sequentially passing through the sixth hydraulic flow path 1406, the eighth hydraulic flow path 1408, and the ninth hydraulic flow path 1409. In this case, the fifth valve 1435 provided in the sixth hydraulic flow path 1406 is provide as a check valve for allowing the flow of the pressurized medium discharged from the first hydraulic circuit 1510, so that the pressurized medium may be recovered. In addition, the seventh valve 14337 is opened to allow the flow of the pressurized medium through the ninth flow path 1409. In addition, the first dump valve 1831 operates to be closed such that negative pressure is effectively generated in the first pressure chamber 1330.

At the same time, to promote the rapid and smooth backward movement of the hydraulic piston 1320, the pressurized medium accommodated in the second pressure chamber 1340 is transferred to the first pressure chamber 1330 by sequentially passing through the tenth hydraulic flow path 1410 and the ninth hydraulic flow path 1409, and to this end, the eighth valve 1438 provided in the tenth hydraulic flow path 1410 is also switched to an open state. In this case, the second dump valve 1841 may operate to be closed to induce the pressurized medium of the second pressure chamber 1340 to be supplied to the first pressure chamber 1330. The first inlet valve 1511a and the second inlet valve 1512a provided in the first hydraulic circuit 1510 are maintained in an open state, and the first outlet valve 1515a and the second outlet valve 1516a are maintained in a closed state.

In addition, the hydraulic pressure of the pressurized medium applied to the third wheel cylinder 23 and the fourth wheel cylinder 24 provided in the second hydraulic circuit 1520 by the negative pressure generated in the first pressure chamber 1330 is recovered to the first pressure chamber 1330 by sequentially passing through the seventh hydraulic flow path 1407, the eight hydraulic flow path 1408, and the ninth hydraulic flow path 1409. As described above, since the sixth valve 1436 provided in the seventh hydraulic flow path 1407 is provided as a check valve for allowing only the flow of the pressurized medium discharged from the second hydraulic circuit 1520, the recovery of the pressurized medium may be performed, and the seventh valve 1437 is opened to allow the flow of the pressurized medium through the ninth hydraulic flow path 1409. In addition, the third inlet valve 1521a and the fourth inlet valve 1522a provided in the second hydraulic circuit 1520 is maintained in an open state.

Figure 7:
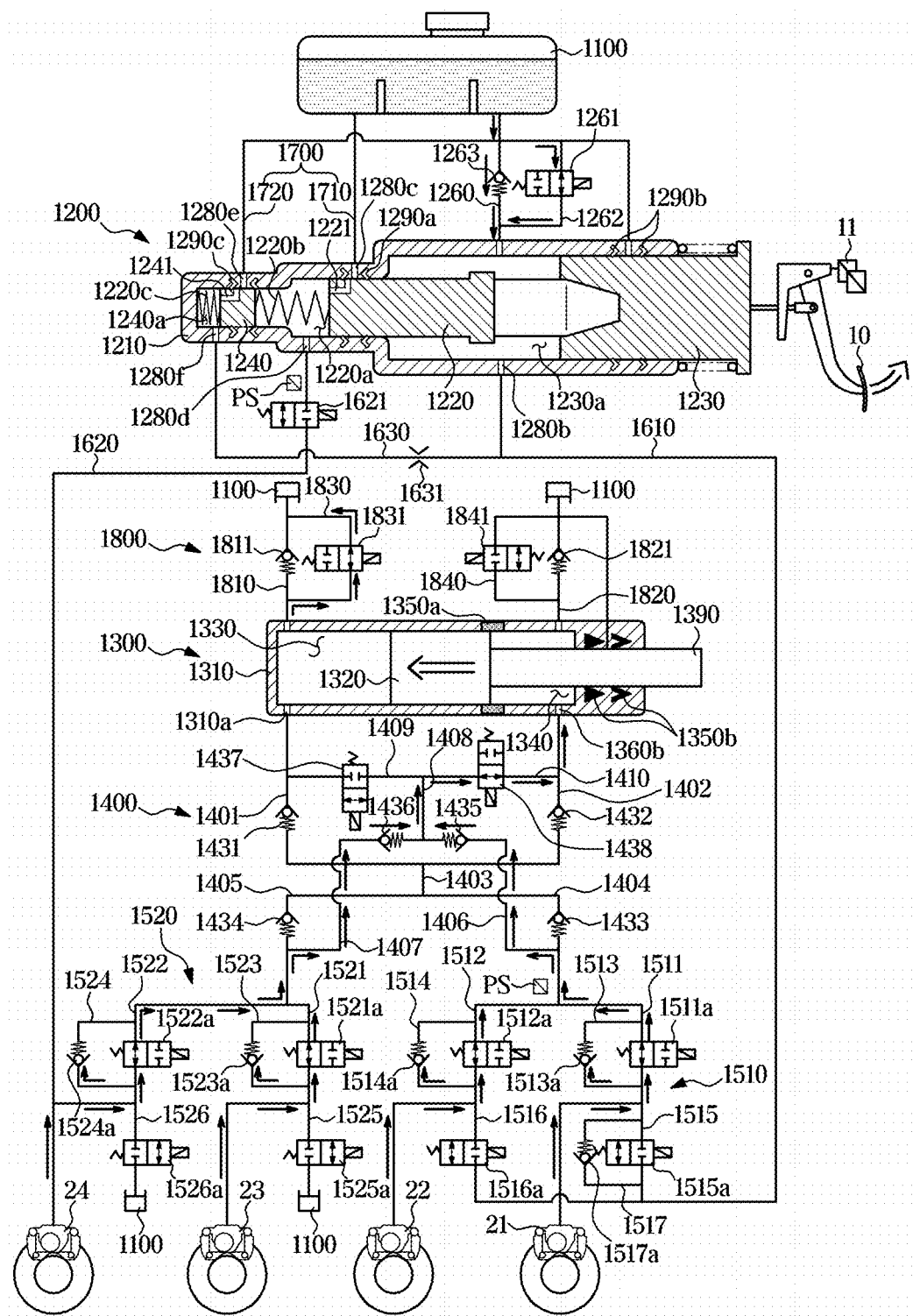
FIG. 7 is a hydraulic circuit diagram illustrating that an electronic brake system according to an embodiment releases the second braking mode.

After the releasing of the third braking mode is completed, it may be switched to the releasing operation of the second braking mode illustrated in FIG. 7 in order to further lower the braking pressure applied to the wheel cylinders 20.

FIG. 7 is a hydraulic circuit diagram illustrating that a hydraulic piston 1320 of an electronic brake system 1000 according to an embodiment releases the second braking mode by moving forward.

Referring to FIG. 7, when the stepping force applied to the brake pedal 10 is released, the motor generates a rotational force in one direction and transfers the rotational force to the power conversion unit, and the power conversion unit moves the hydraulic piston 1320 forward. Accordingly, the hydraulic pressure in the second pressure chamber 1340 is released, and at the same time, a negative pressure may be generated, so that the pressurized medium in the wheel cylinders 20 may be transferred to the second pressure chamber 1340.

Specifically, the hydraulic pressure of the pressurized medium applied to the first wheel cylinder 21 and the second wheel cylinder 22 provided in the first hydraulic circuit 1510 is recovered to the second pressure chamber 1340 by sequentially passing through the sixth hydraulic flow path 1406, the eighth hydraulic flow path 1408, and the tenth flow path 1410. In this case, the fifth valve 1435 provided in the sixth hydraulic flow path 1406 allows only the flow of the pressurized medium discharged from the first hydraulic circuit 1510 so that the pressurized medium may be recovered, and the eighth valve 1438 provided in the tenth hydraulic flow path 1410 is switched to be opened, to thereby allow the flow of the pressurized medium transferred along the tenth hydraulic flow path 1410. In addition, the seventh valve 1437 is controlled to be closed to prevent the recovered pressurized medium from leaking into the first pressure chamber 1330 via the ninth hydraulic flow path 1409. Also, the first inlet valve 1511a and the second inlet valve 1512a provided in the first hydraulic circuit 1510 are maintained in the open state, and the first outlet valve 1515a and the second outlet valve 1516a are maintained in the closed state.

Also, the hydraulic pressure of the pressurized medium applied to the third wheel cylinder 23 and the fourth wheel cylinder 24 provided in the second hydraulic circuit 1520 by the negative pressure generated in the second pressure chamber 1340 is recovered to the second pressure chamber 1340 by sequentially passing through the seventh hydraulic flow path 1407, the eighth hydraulic flow path 1408, and the tenth hydraulic flow path 1410. As described above, since the sixth valve 1436 provided in the seventh hydraulic flow path 1407 allows the flow of the pressurized medium discharged from the second hydraulic circuit 1520, and since the eighth valve 1438 provided in the tenth hydraulic flow path 1410 is opened, the pressurized medium may be smoothly recovered to the second pressure chamber 1340. Furthermore, the seventh valve 1437 is controlled to be closed to prevent the pressurized medium recovered from the first hydraulic circuit 1510 from leaking into the first pressure chamber 1330 through the ninth hydraulic flow passage 1409. The third inlet valve 1521*a* and the fourth inlet valve 1522*a* provided in the second hydraulic circuit 1520 are provided in the open state, and the third outlet valve 1525*a* and the fourth outlet valve 1526*a* are maintained in a closed state.

When the second braking mode is released, the first dump valve 1831 may be opened to implement smooth forward movement of the hydraulic piston 1320, and the second dump valve 1841 may be switched into a closed state such that negative pressure is rapidly generated in the second pressure chamber 1340.

Figure 8:
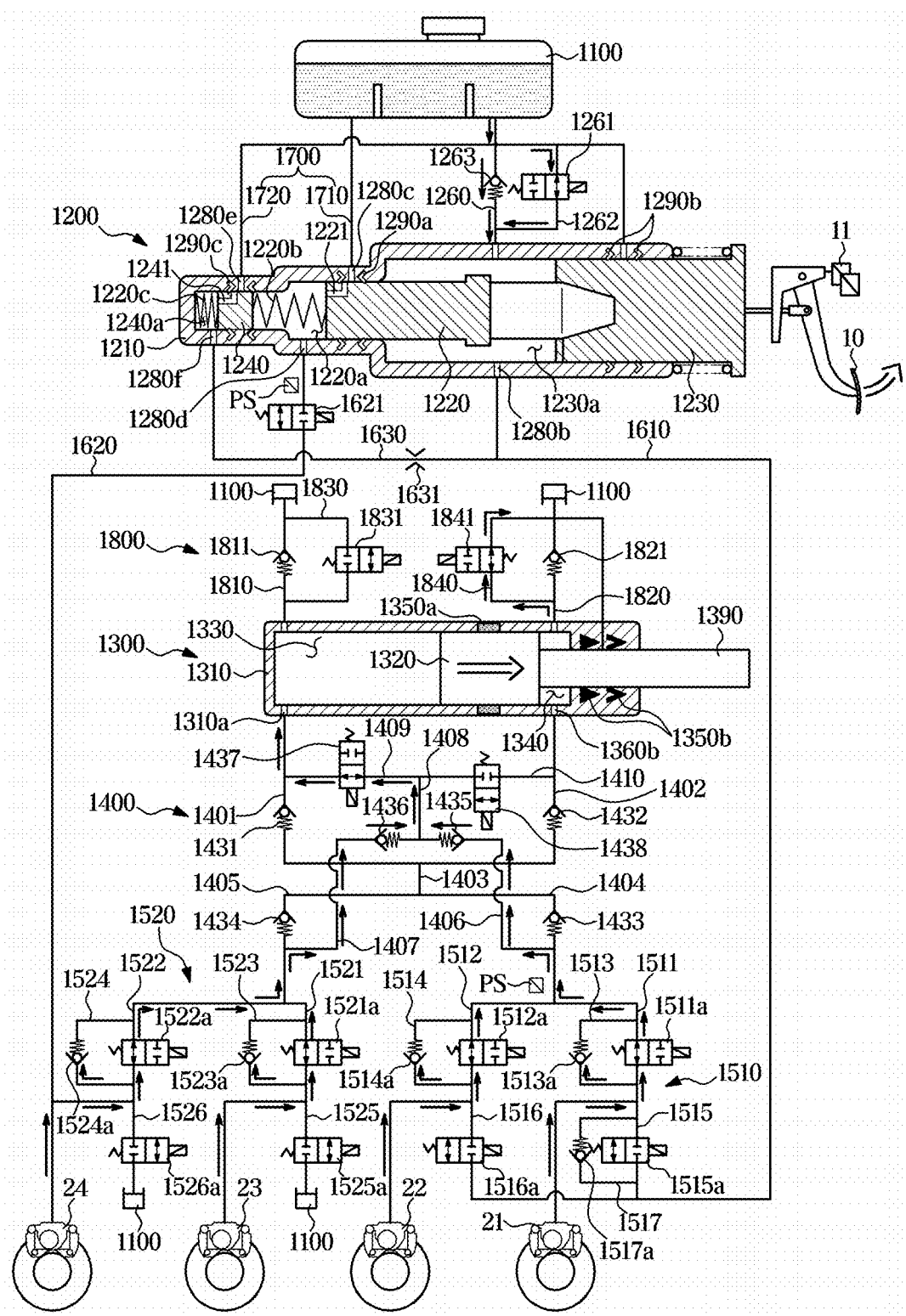
FIG. 8 is a hydraulic circuit diagram illustrating that an electronic brake system according to an embodiment releases the first braking mode.

After the releasing of the second braking mode is completed, it may be switched to the releasing operation of the first braking mode illustrated in FIG. 8 in order to completely release the braking pressure applied to the wheel cylinders 20.

FIG. 8 is a hydraulic circuit diagram illustrating that a hydraulic piston 1320 of an electronic brake system 1000 according to an embodiment moves backward again to release the first braking mode.

Referring to FIG. 8, when the stepping force applied to the brake pedal 10 is released, the motor generates a rotational force in the other direction and transfers the rotational force to the power conversion unit, and the power conversion unit moves the hydraulic piston 1320 backward. Accordingly, a negative pressure may be generated in the first pressure chamber 1330, so that the pressurized medium in the wheel cylinders 20 may be transferred to the first pressure chamber 1330.

Specifically, the hydraulic pressure in the first and second wheel cylinders 21 and 22 provided in the first hydraulic circuit 1510 is recovered to the first pressure chamber 1330 by sequentially passing through the sixth hydraulic flow path 1406, the eighth hydraulic flow path 1408, and the ninth hydraulic flow path 1409. In this case, the fifth valve 1435 provided in the sixth hydraulic flow path 1406 is provided as a check valve for allowing the flow of the pressurized medium discharged from the first hydraulic circuit 1510 so that the pressurized medium may be transferred. The seventh valve 1437 is opened to allow the flow of the pressurized medium through the ninth hydraulic flow path 1409. The first inlet valve 1511*a* and the second inlet valve 1512*a* provided in the first hydraulic circuit 1510 are maintained in the open state, and the first outlet valve 1515*a* and the second outlet valve 1516*a* are maintained in the closed state. In addition, the eighth valve 1438 is controlled to a closed state to prevent the pressurized medium recovered from the first hydraulic circuit 1510 from leaking into the second pressure chamber 1340 through the tenth hydraulic flow path 1410, and the first dump valve 1831 operates to be closed so as to effectively form a negative pressure in the first pressure chamber 1330.

Also, the hydraulic pressure of the pressurized medium applied to the third wheel cylinder 23 and the fourth wheel cylinder 24 provided in the second hydraulic circuit 1520 by the negative pressure generated in the first pressure chamber 1330 is recovered to the first pressure chamber 1330 by sequentially passing through the seventh hydraulic flow path 1407, the eighth hydraulic flow path 1408, and the ninth hydraulic flow path 1409. As described above, since the sixth valve 1436 provided in the seventh hydraulic flow path 1407 is provided as a check valve that allows only the flow of the pressurized medium discharged from the second hydraulic circuit 1520, the pressurized medium may be recovered, and the seventh valve 1437 is opened to allow the flow of the pressurized medium through the ninth hydraulic flow path 1409. In addition, the third inlet valve 1521*a* and the fourth inlet valve 1522*a* provided in the second hydraulic circuit 1520 are maintained in an open state. Furthermore, the eighth valve 1438 is controlled to be closed to prevent the pressurized medium recovered from the second hydraulic circuit 1520 from leaking into the second pressure chamber 1340 through the tenth hydraulic flow path 1410. The third inlet valve 1521*a* and the fourth inlet valve 1522*a* provided in the second hydraulic circuit 1520 are provided in the open state.

At the same time, the second dump valve 1841 is opened to implement rapid and smooth backward movement of the hydraulic piston 1320 such that the pressurized medium accommodated in the second pressure chamber 1340 may be discharged to the reservoir 1100 through the second bypass passage 1840.

Hereinafter, an operation method in a case where an electronic brake system 1000 according to an embodiment does not operate normally, that is, in the fallback mode will be described.

Figure 9:
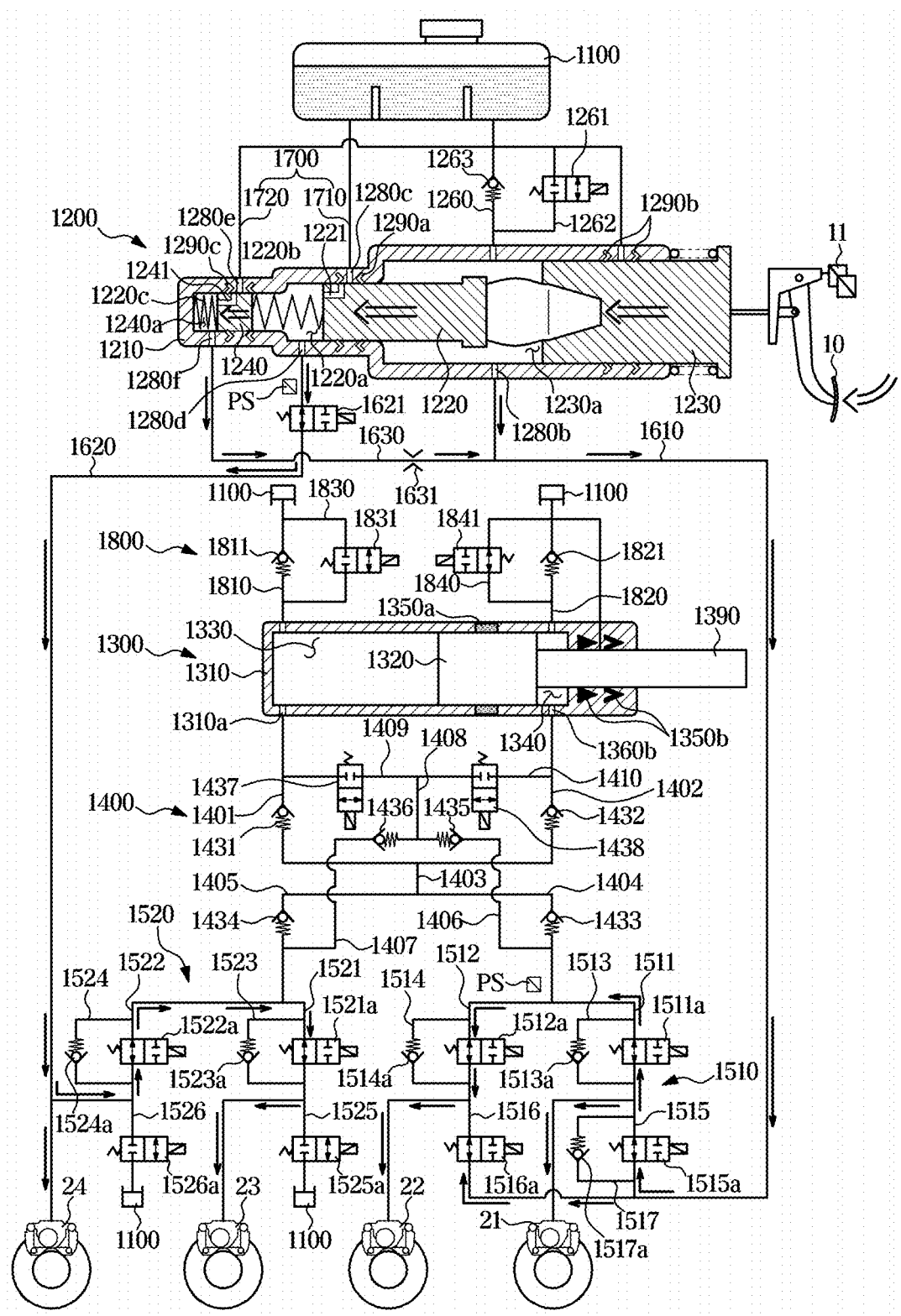
FIG. 9 is a hydraulic circuit diagram illustrating that an electronic brake system according to an embodiment performs an abnormal operation mode (fallback mode).

FIG. 9 is a hydraulic circuit diagram illustrating the operation of an electronic brake system 1000 according to an embodiment in an abnormal operation mode (fallback mode) when a normal operation is impossible due to a device failure or the like.

Referring to FIG. 9, in the abnormal operation mode, each of the valves is controlled to an initial braking state which is a non-operational state. In this case, when the driver depresses the brake pedal 10, the simulation piston 1230 connected to the brake pedal 10 moves forward to generate a displacement. By the forward movement of the simulation piston 1230, the pressurized medium accommodated in the simulation chamber 1230*a* is transferred to the first wheel cylinder 21 and the second wheel cylinder 22 of the first hydraulic circuit 1510 along the first backup flow path 1610, thereby performing braking.

Also, the pressurized medium accommodated in the simulation chamber 1230*a* moves the first master piston 1220 forward to generate a displacement, so that the pressurized medium accommodated in the first master chamber 1220*a* is transferred to the third wheel cylinder 23 and the fourth wheel cylinder 24 of the second hydraulic circuit 1520 along the second backup flow path 1620, thereby performing braking. At the same time, the second master piston 1240 also generates a displacement by moving forward due to the displacement of the first master piston 1220, so that the pressurized medium accommodated in the second master chamber 1240*a* may be provided to the first hydraulic circuit 1510 by joining into the first backup flow path 1610 along the auxiliary backup flow path 1630.

With such a configuration, when the hydraulic pressure of the pressurized medium pressurized in the simulation chamber 1230*a* is provided at a level lower than that of the hydraulic pressure of the pressurized medium pressurized in the first master chamber 1220*a* due to the reaction force of the elastic member 1250 disposed in the simulation chamber 1230*a*, the lowered hydraulic pressure is compensated by the hydraulic pressure of the pressurized medium pressurized in the second master chamber 1240*a*, so that the balance of the hydraulic pressure provided to the first and second backup flow paths 1610 and 1620 may be stably maintained. In addition, in this case, by providing the simulation piston 1230, and the first and second master pistons 1220 and 1240 in different diameters, the imbalance in hydraulic pressure caused by the displacement difference of the pistons is resolved, and stable braking may be achieved.

Hereinafter, the inspection mode of an electronic brake system 1000 according to an embodiment will be described.

Figure 10:
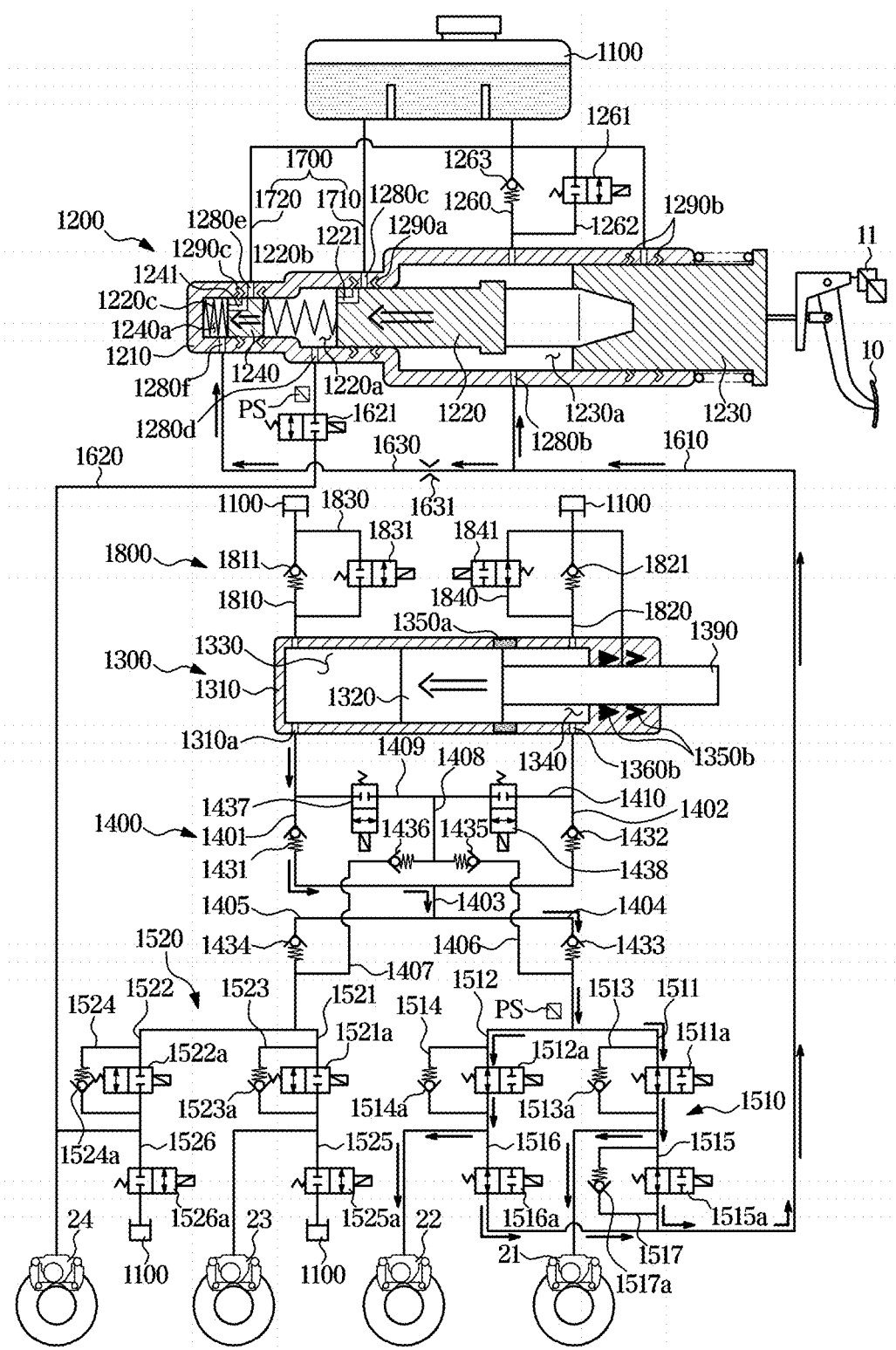
FIG. 10 is a hydraulic circuit diagram illustrating that an electronic brake system according to an embodiment performs an inspection mode.

FIG. 10 is a hydraulic circuit diagram illustrating the inspection mode of an electronic brake system 1000 according to an embodiment, and referring to FIG. 10, the electronic brake system 1000 according to the embodiment may perform the inspection mode of inspecting whether the integrated master cylinder 1200 or the simulator valve 1261 has a leak. When the inspection mode is performed, the electronic control unit controls to supply the hydraulic pressure generated from the hydraulic pressure supply device 1300 to the simulation chamber 1230a and the second master chamber 1240a of the integrated master cylinder 1200.

Specifically, in a state in which each of the valves is controlled to the initial braking state, which is a non-operational state, the electronic control unit operates to move the hydraulic piston 1320 forward, so that a hydraulic pressure is generated in the first pressure chamber 1330, the cut valve 1621 and the third and fourth inlet valves 1521a and 1522a are switched to a closed state. Accordingly, the hydraulic pressure generated in the first pressure chamber 1330 is transferred to the first hydraulic circuit 1510 side by sequentially passing through the first hydraulic flow path 1401, the third hydraulic flow path 1403, and the fourth hydraulic flow path 1404, and the pressurized medium transferred to the second hydraulic circuit 1520 is introduced into the simulation chamber 1230a through the first backup flow path 1610, and is introduced into the second master chamber 1240a through the auxiliary backup flow path 1630. In this case, the simulator valve 1261 is maintained in the closed state to induce the first master chamber 1220a to be in a sealed state.

In this state, an expected hydraulic pressure value of the pressurized medium to be generated by the displacement of the hydraulic piston 1320 is compared with a hydraulic pressure value in the first hydraulic circuit 1510 or the first master chamber 1220a measured by the pressure sensor PS, so that a leak in the integrated master cylinder 1200 or the simulator valve 1261 may be diagnosed. Specifically, the expected hydraulic pressure value calculated based on a displacement amount of the hydraulic piston 1320 or a rotation angle measured by a motor control sensor (not shown) is compared with an actual hydraulic pressure value measured by the pressure sensor PS, and when the two hydraulic pressure values match, it may be determined that there is no leak in the integrated master cylinder 1200 or the simulator valve 1261. On the other hand, when the actual hydraulic pressure value measured by the pressure sensor PS is lower than the expected hydraulic pressure value calculated based on the displacement amount of the hydraulic piston 1320 or the rotation angle measured by the motor control sensor (not shown), because this is due to the loss of a part of the hydraulic pressure of the pressurized medium applied to the first master chamber 1220a, it is determined that there is a leak in the integrated master cylinder 1200 or the simulator valve 1261, and this leak may be notified to the driver.

The invention claimed is:

1. An electronic brake system comprising:
a reservoir in which a pressurized medium is stored;
an integrated master cylinder having a simulation chamber, a first master chamber, and a second master chamber arranged in order from a side of a brake pedal;
a reservoir flow path communicating the integrated master cylinder with the reservoir;
a hydraulic pressure supply device configured to generate a hydraulic pressure by operating according to an electrical signal output in response to a displacement of the brake pedal;
a first hydraulic circuit and a second hydraulic circuit configured to control a flow of the hydraulic pressure transferred to a wheel cylinder;
a first backup flow path connecting the simulation chamber to the first hydraulic circuit;
a second backup flow path connecting the first master chamber to the second hydraulic circuit; and
an auxiliary backup flow path connecting the second master chamber to the first backup flow path;
and a hydraulic control unit configured to control a flow of the hydraulic pressure transferred to the first hydraulic circuit and the second hydraulic circuit, wherein the integrated master cylinder includes a simulation piston provided to be displaceable by the brake pedal and configured to pressurize the simulation chamber, a first master piston configured to pressurize the first master chamber and having a diameter smaller than a diameter of the simulation piston, a second master piston configured to pressurize the second master chamber and having a diameter smaller than a diameter of the first master piston, and an elastic member interposed between the simulation piston and the first master piston to provide the brake pedal with a reaction force.

2. The electronic brake system according to claim 1, comprising:
at least one outlet valve provided in the first backup flow path and configured to control a flow of the pressurized medium; and
a cut valve provided in the second backup flow path and configured to control a flow of the pressurized medium.

3. The electronic brake system according to claim 2, wherein the second backup flow path is connected to an inlet flow path downstream of at least one of two inlet valves of the second hydraulic circuit.

4. The electronic brake system according to claim 3, wherein the auxiliary backup flow path is provided with an orifice.

5. The electronic brake system according to claim 4, wherein the at least one outlet valve connected to the first backup flow path is connected in parallel to a check valve for allowing a flow of the pressurized medium from the first backup flow path to the wheel cylinder.

6. The electronic brake system according to claim 2, further comprising:
a simulation flow path connecting the simulation chamber to the reservoir and provided with a simulator check valve for allowing only a flow of the pressurized medium from the reservoir to the simulation chamber; and
a simulator bypass flow path provided with a simulator valve that is connected in parallel to the simulator check valve and controls bidirectional flows of the pressurized medium.

7. The electronic brake system according to claim 1, wherein the reservoir flow path includes:
a first reservoir flow path connecting the first master chamber to the reservoir; and
a second reservoir flow path connecting the second master chamber to the reservoir.

8. An electronic brake system comprising:
a reservoir in which a pressurized medium is stored;
an integrated master cylinder having a simulation chamber, a first master chamber, and a second master chamber arranged in order from a side of a brake pedal;
a reservoir flow path communicating the integrated master cylinder with the reservoir;
a hydraulic pressure supply device configured to generate a hydraulic pressure by operating according to an electrical signal output in response to a displacement of the brake pedal;
a first hydraulic circuit and a second hydraulic circuit configured to control a flow of the hydraulic pressure transferred to a wheel cylinder;
and a hydraulic control unit configured to control a flow of the hydraulic pressure transferred to the first hydraulic circuit and the second hydraulic circuit, wherein the integrated master cylinder includes a simulation piston provided to be displaceable by the brake pedal and configured to pressurize the simulation chamber, a first master piston configured to pressurize the first master chamber and having a diameter smaller than a diameter of the simulation piston, a second master piston configured to pressurize the second master chamber and having a diameter smaller than a diameter of the first master piston, and an elastic member interposed between the simulation piston and the first master piston to provide the brake pedal with a reaction force;
wherein the hydraulic pressure supply device includes a first pressure chamber and a second pressure chamber pressurized according to a forward movement and a backward movements, respectively, of a hydraulic piston, wherein the hydraulic control unit comprises:
a first hydraulic flow path in communication with the first pressure chamber;
a second hydraulic flow path in communication with the second pressure chamber;
a third hydraulic flow path at which the first hydraulic flow path and the second third hydraulic flow path join;
a fourth hydraulic flow path branched from the third hydraulic flow path and connected to the first hydraulic circuit;
a fifth hydraulic flow path branched from the third hydraulic flow path and connected to the second hydraulic circuit;
a sixth hydraulic flow path in communication with the first hydraulic circuit;
a seventh hydraulic flow path in communication with the second hydraulic circuit;
an eighth hydraulic flow path at which the sixth hydraulic flow path and the seventh hydraulic flow path join;
a ninth hydraulic flow path branched from the eighth hydraulic flow path and connected to the first pressure chamber; and
a tenth hydraulic flow path branched from the eighth hydraulic flow path and connected to the second pressure chamber.

9. The electronic brake system according to claim 8, wherein the hydraulic control unit includes:
a first valve provided in the first hydraulic flow path to control a flow of the pressurized medium;
a second valve provided in the second hydraulic flow path to control a flow of the pressurized medium;
a third valve provided in the fourth hydraulic flow path to control a flow of the pressurized medium;
a fourth valve provided in the fifth hydraulic flow path to control a flow of the pressurized medium;
a fifth valve provided in the sixth hydraulic flow path to control a flow of the pressurized medium;
a sixth valve provided in the seventh hydraulic flow path to control a flow of the pressurized medium;
a seventh valve provided in the ninth hydraulic flow path to control a flow of the pressurized medium; and
an eighth valve provided in the tenth hydraulic flow path to control a flow of the pressurized medium.

10. The electronic brake system according to claim 9, wherein:
the first valve is provided as a check valve for allowing only a flow of the pressurized medium discharged from the first pressure chamber;
the second valve is provided as a check valve for allowing only a flow of the pressurized medium discharged from the second pressure chamber;
the third valve is provided as a check valve for allowing only a flow of the pressurized medium from the third hydraulic flow path toward the first hydraulic circuit;
the fourth valve is provided as a check valve for allowing only a flow of the pressurized medium from the third hydraulic flow path toward the second hydraulic circuit;
the fifth valve is provided as a check valve for allowing only a flow of the pressurized medium discharged from the first hydraulic circuit;
the sixth valve is provided as a check valve for allowing only a flow of the pressurized medium discharged from the second hydraulic circuit; and
the seventh valve and the eighth valve are each provided as a solenoid valve for controlling bidirectional flows of the pressurized medium.

11. The electronic brake system according to claim 10, further comprising a dump controller provided between the reservoir and the hydraulic pressure supply device to control a flow of the pressurized medium, wherein the dump controller comprises:
a first dump flow path provided to connect the first pressure chamber to the reservoir;
a first dump check valve provided in the first dump flow path to allow only a flow of the pressurized medium from the reservoir toward the first pressure chamber;
a first bypass flow path connected in parallel to the first dump check valve on the first dump flow path;
a first dump valve provided in the first bypass flow path to control bidirectional flows of the pressurized medium;
a second dump flow path provided to connect the second pressure chamber to the reservoir;
a second dump check valve provided in the second dump flow path to allow only a flow of the pressurized medium from the reservoir toward the second pressure chamber;
a second bypass flow path connected in parallel to the second dump check valve on the second dump flow path; and
a second dump valve provided in the second bypass flow path to control bidirectional flows of the pressurized medium.

12. The electronic brake system according to claim 1, wherein the first master chamber has a diameter smaller than a diameter of the simulation chamber, and larger than a diameter of the second master chamber.

13. An operation method of the electronic brake system according to claim 11, comprising:
a first braking mode in which the first pressure chamber is pressurized;

a second braking mode in which the second pressure chamber is pressurized after the first braking mode; and
a third braking mode in which the first pressure chamber is pressurized after the second braking mode.

14. The operation method of the electronic brake system according to claim 13, wherein in the first braking mode, the seventh valve, the eight valve, and the first dump valve are closed, and the second dump valve is open, and the hydraulic pressure generated in the first pressure chamber is provided to the first hydraulic circuit by sequentially passing through the first hydraulic flow path, the third hydraulic flow path, and the fourth hydraulic flow path, and provided to the second hydraulic circuit by sequentially passing through the first hydraulic flow path, the third hydraulic flow path, and the fifth hydraulic flow path.

15. The operation method of the electronic brake system according to claim 13, wherein in the second braking mode, the seventh valve, the eight valve, and the second dump valve are closed, and the first dump valve is open, the hydraulic pressure generated in the second pressure chamber is provided to the first hydraulic circuit by sequentially passing through the second hydraulic flow path, the third hydraulic flow path, and the fourth hydraulic flow path, and provided to the second hydraulic circuit by sequentially passing through the second hydraulic flow path, the third hydraulic flow path, and the fifth hydraulic flow path.

16. The operation method of the electronic brake system according to claim 13, wherein in the third braking mode, the seventh valve and the eight valve are open, and the first dump valve and the second dump valve are closed, at least a part of the hydraulic pressure generated in the first pressure chamber is provided to the first hydraulic circuit by sequentially passing through the first hydraulic flow path, the third hydraulic flow path, and the fourth hydraulic flow path, and provided to the second hydraulic circuit by sequentially passing through the first hydraulic flow path, the third hydraulic flow path, and the fifth hydraulic flow path, and a remaining part of the hydraulic pressure generated in the first pressure chamber is provided to the second pressure chamber by sequentially passing through the ninth hydraulic flow path and the tenth hydraulic flow path.

17. An operation method of the electronic brake system according to claim 6, wherein in a normal operation mode, the cut valve and the at least outlet valve are closed, the simulator valve is open, the elastic member is caused to be compressed by the simulation piston according to an operation of the brake pedal, and a reaction force of the elastic member is delivered to a driver as pedal feel.

18. The operation method of the electronic brake system according to claim 17, wherein in an abnormal operation mode, the cut valve and the at least outlet valve are open, the simulator valve is closed, the pressurized medium in the simulation chamber is provided to the first hydraulic circuit through the first backup flow path according to a stepping force of the brake pedal, the pressurized medium in the first mater chamber is provided to the second hydraulic circuit through the second backup flow path, and the pressurized medium in the second master chamber is provided to the first backup flow path by sequentially passing through the auxiliary backup flow path and the first backup flow path.

19. The operation method of the electronic brake system according to claim 17, wherein in an inspection mode, the cut valve is closed, the hydraulic pressure in the hydraulic pressure supply device is provided to the simulation chamber by passing through the first backup flow path through the first hydraulic circuit, and is provided to the second master chamber from the first backup flow path through the auxiliary backup flow path.

\* \* \* \* \*